(12) United States Patent
Kabbes

(10) Patent No.: US 10,237,224 B2
(45) Date of Patent: Mar. 19, 2019

(54) CONTEXT AWARE SERIALIZATION

(71) Applicant: Dropbox, Inc., San Francisco, CA (US)

(72) Inventor: Steven Kabbes, Mountain View, CA (US)

(73) Assignee: Dropbox, Inc., San Francisco, CA (US)

(*) Notice: Subject to any disclaimer, the term of this patent is extended or adjusted under 35 U.S.C. 154(b) by 27 days.

(21) Appl. No.: 14/257,953

(22) Filed: Apr. 21, 2014

(65) Prior Publication Data
US 2015/0304264 A1    Oct. 22, 2015

(51) Int. Cl.
*G06F 15/16* (2006.01)
*H04L 12/58* (2006.01)

(52) U.S. Cl.
CPC .................. *H04L 51/22* (2013.01)

(58) Field of Classification Search
CPC ............................ H04L 51/22; H04L 47/70
USPC ................. 709/206, 219; 707/704, 737, 803
See application file for complete search history.

(56) References Cited

U.S. PATENT DOCUMENTS

| | | | |
|---|---|---|---|
| 6,072,942 A | 6/2000 | Stockwell et al. | |
| 6,523,078 B1* | 2/2003 | Desai | G06F 9/526 710/200 |
| 9,367,579 B1* | 6/2016 | Kumar | G06F 16/1734 |
| 2004/0107185 A1* | 6/2004 | Najork | G06F 17/30961 |
| 2004/0123261 A1* | 6/2004 | Alpert | G06F 17/5077 716/114 |
| 2004/0133591 A1* | 7/2004 | Holenstein | G06F 11/2064 |
| 2005/0228827 A1* | 10/2005 | McCauley | G06F 17/30566 |
| 2009/0083851 A1 | 3/2009 | Michelle et al. | |
| 2011/0314384 A1 | 12/2011 | Lindgren | |
| 2013/0007167 A1 | 1/2013 | Smith et al. | |
| 2013/0124548 A1 | 5/2013 | Chhaparia et al. | |
| 2013/0138896 A1* | 5/2013 | McKenney | G06F 13/1663 711/147 |
| 2014/0074841 A1* | 3/2014 | Majnemer | G06F 17/30327 707/737 |
| 2014/0310317 A1* | 10/2014 | Spillane | G06F 17/30961 707/803 |

* cited by examiner

*Primary Examiner* — Thuong Nguyen
(74) *Attorney, Agent, or Firm* — DLA Piper LLP US

(57) ABSTRACT

Certain embodiments of the present invention relate to techniques for serializing account and message management actions performed at a message management service for synchronization with a messaging service. A message management service can receive requests from a client device and/or a messaging service to perform actions on resources for an email message account. The actions can include account-related actions, folder-related actions, message thread-related actions, and/or message-related actions. Message management service can implement techniques for serializing actions that conflict, such as actions on a resource (e.g., a message account, a message, a folder, or a message thread) that conflict with other actions on the same resource and/or other resources that have a dependency relationship. By performing serialization, message management service can prevent conflicting actions from being performed concurrently, while enabling non-conflicting actions to be performed in parallel, thereby improving performance for execution of actions.

20 Claims, 11 Drawing Sheets

```
                                Node 11 (N11)                    610
Resource: Email Thread 1
Parent Node: N1
Child Nodes: N6, N7
Lock:Acquired/Released
```

```
                                Node 12 (N12)                    620
Resource: Email Thread 2
Parent Node: N1
Child Nodes: N8, N13
Lock:Acquired/Released
```

CONTEXT AWARE SERIALIZATION

BACKGROUND

The present disclosure relates generally to managing messages and in particular to serializing actions performed by a message management service.

Electronic messaging, or electronic message communication, generally refers to the communication of electronic messages from a sender to one or more recipients via a computing system. One widely used form of electronic message communication includes email. A "message" can include any electronic communication generated by a sender and directed to one or more recipients, such as email messages, instant messages, SMS/MMS messages, voice messages, photo/image messages, social network messages, and so on. Applications or client devices can communicate and access electronic messages via a messaging service, which maintains a storage repository of the messages. Examples of a messaging service can include Gmail™ (a service of Google Inc.) and Yahoo!® Mail (a service of Yahoo! Inc.).

In recent years, message management services have been developed to facilitate access to messages stored by an electronic messaging service for email accounts. However, messaging services may not enable access to synchronization resources (e.g., synchronization primitives) for serializing actions performed for managing an email account. Better techniques for managing serialization for an email account are therefore desirable.

SUMMARY

Certain embodiments of the present invention relate to techniques for serializing account and message management actions performed by a message management service for synchronization with a messaging service (e.g., a message service provider) for a message account (e.g., an email message account). The message management service can receive requests from a client device and/or a messaging service to perform actions on resources for an email message account. The actions can include account-related actions (e.g., synchronizing an email account, updating account settings for an email account, etc.), folder-related actions (e.g., creating a folder, updating a folder, deleting a folder, moving emails between folders, etc.), message thread-related actions (e.g., updating a thread, creating a thread, deleting a thread, etc.), and/or message-related actions (e.g., creating an email, updating an email, deleting an email, marking a message as read/unread, etc.). The message management service can implement techniques to serialize actions that can conflict, such as actions performed on the same resource (e.g., a message account, a message, a folder, or a message thread) and/or actions that can be performed on resources that have a dependency relationship. Serializing actions enables the message management service to prevent conflicting actions from being performed concurrently, while enabling non-conflicting actions to be performed in parallel.

In certain embodiments, the message management service can implement techniques for serializing actions by using a hierarchical data structure (e.g., a locking tree data structure) that indicates dependency relationships between the resources available for a message account. The message management service can implement a locking scheme using the hierarchical data structure, such that each different resource for a message account can be assigned a different lock. The information about a lock can be associated with an assigned resource. The locks can be used to manage serializing actions performed for the assigned resource. Based on the dependency relationships of the resources and the state of a lock for each of the resources, the message management service can determine whether to perform an action for a resource or prevent (e.g., block) the action from being performed until a later time.

In some embodiments, the hierarchical data structure can include a plurality of node data structures ("a node"). Each node can include information about a distinct resource of a message account. Each node can include information about the status of a serialization lock. The status of the serialization lock for a node can be used when determining whether an action can be performed for the resource corresponding to the node. In some embodiments, the message management service can determine whether to perform an action for a resource based on the status of a lock for a node corresponding to the resource and the status of a lock corresponding to each different node that has a dependency relationship with the node. Actions can be performed concurrently (e.g., non-conflicting actions) when the actions are to be performed for resources corresponding to nodes that do not have a dependency relationship with each other. Such actions performed concurrently can improve performance. Actions that cannot be performed concurrently (e.g., conflicting actions) are performed on resources corresponding to nodes that have a dependency relationship. To serialize an action that can conflict with other actions, the message management service can use the hierarchical data structure to determine an availability of a serialization lock for a resource identified by an action and each resource having a dependency relationship with the resource identified by the action. In some embodiments, a conflicting action can be performed in the event that a lock can be acquired for the resource identified by the conflicting action and that a lock can be acquired for each resource having a dependency relationship with the resource identified by the action.

In some embodiments, the message management service can optimize scheduling of requested actions for a message account by performing non-conflicting actions concurrently with each other. For example, while an action is being performed for an email message, actions can be performed for other email messages. In another example, while an action is being performed for a message folder, actions can be performed for other message folders. In these examples, each resource to which an action is being performed can correspond to a node that does not have a dependency relationship with any other node that corresponds to a similar type of resource identified for a different action.

Some embodiments can perform one or more techniques for improving the serializing of actions performed at the message management service. One such technique can be a method, which can be performed by a server computer of the message management service. The server computer can receive a request to perform a first action for a first resource of an email message account provided by a messaging service. The server computer can identify a first node, in a hierarchical data structure, that corresponds to the first resource indicated by the request. The hierarchical data structure can include a plurality of nodes. Each node can correspond to a different resource of the email message account for which actions can be performed. The server computer can identify at least one second node in the hierarchical data structure that has a dependency relationship with the first node. Each identified second node can correspond to a different second resource of the email message account. The server computer can determine whether a lock has been acquired for the first node or an identified second node. In the event that a lock has not been acquired for the first node and each identified second node, the server computer can: 1) acquire a lock for the first node; 2) perform the first action for the first resource; and 3) release the lock for the first node after the first action is performed. In the event that a lock has been acquired for the first node or an identified node, the server computer can block the first action from being performed for the first resource until a lock is acquirable for the first node.

The following detailed description together with the accompanying drawings will provide a better understanding of the nature and advantages of the present invention.

DETAILED DESCRIPTION

Certain embodiments of the present invention relate to techniques for serializing account and message management actions performed by a message management service for synchronization with a messaging service (e.g., a message service provider) for a message account (e.g., an email message account). The message management service can receive requests from a client device and/or a messaging service to perform actions on resources for an email message account. The actions can include account-related actions (e.g., synchronizing an email account, updating account settings for an email account, etc.), folder-related actions (e.g., creating a folder, updating a folder, deleting a folder, moving emails between folders, etc.), message thread-related actions (e.g., updating a thread, creating a thread, deleting a thread, etc.), and/or message-related actions (e.g., creating an email, updating an email, deleting an email, marking a message as read/unread, etc.). The message management service can implement techniques to serialize actions that can conflict, such as actions performed on the same resource (e.g., a message account, a message, a folder, or a message thread) and/or actions that can be performed on resources that have a dependency relationship. Serializing actions enables the message management service to prevent conflicting actions from being performed concurrently, while enabling non-conflicting actions to be performed in parallel.

Figure 1:
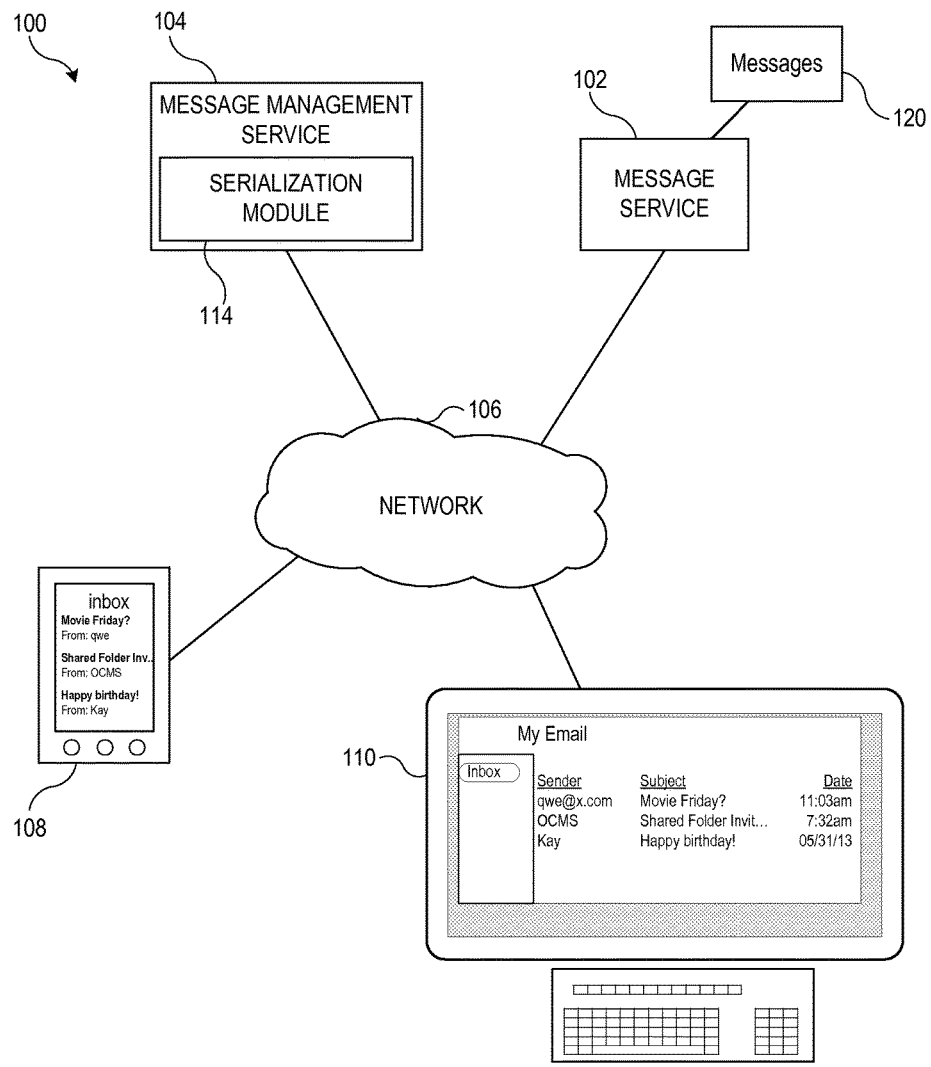
FIG. 1 shows a block diagram of a communication system according to an embodiment of the present invention.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 and/or message management service 104. In this example, client 108 and client 110 can access messaging server 102 via message management service 104. Network 106 can be, for example, the Internet, a mobile network, a wireless network, a cellular network, other communication networks, or a combination thereof.

Messaging service 102 can be any service that allows users to send, receive, store, and/or access messages, where a "message" can include any electronic communication generated by a sender and directed to one or more recipients, such as email messages, instant messages, SMS/MMS messages, voice messages, photo/image messages, social network messages, and so on. Examples of messaging service 102 can include Gmail™ (a service of Google Inc.) and Yahoo!® Mail (a service of Yahoo! Inc.). In some embodiments, a user can establish an account (e.g., an email account) with messaging service 102, and messaging service 102 can store and provide access to the user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, message management service 104 can include a serialization module 114 that provides enhanced functionality, which includes implementation of techniques for serializing account and message management actions performed at a message management service for synchronization with messaging service 102. Message management service 104 can receive requests from a client device (e.g., client 108 or client 110) and/or messaging service 102 to perform actions on resources (e.g., an account, a folder, a message, and/or a message thread) for an email message account (referred to herein as an email account). The actions can include account-related actions such as updating account settings (e.g., password, user name, etc.) and synchronizing messages (e.g., email messages) stored locally by message management service 104 and messages stored by messaging service 102. Other actions can include folder-related actions and/or message thread-related actions. For example, folder-related actions can include deleting a folders and/or threads, updating folders and/or threads, synchronizing folders and/or threads of messages between message management service 104 and messaging service 102. Other actions can also include message-related actions. For example, message-related operations can include creating messages, moving messages to different folders, flagging messages (e.g., marking messages as read or unread), deleting messages, sending messages, etc.

Serialization module 114 can implement techniques for serializing actions to prevent (e.g., block or postpone) conflicting actions for an account from being performed concurrently and to permit non-conflicting actions to be performed concurrently. Actions can be performed concurrently (e.g., non-conflicting actions) when the actions are to be performed for resources that do not have a dependency relationship with each other. Actions that cannot be performed concurrently (e.g., conflicting actions) can correspond to actions performed on the same resource or resources that have a dependency relationship. Resources can have a dependency relationship if an action cannot be performed on one of the resources without affecting how an action is performed for the other dependent resources. In some embodiments, multiple actions cannot be performed concurrently on the same resource because a change to the same resource can affect how a subsequent action is performed for that resource. For example, an action performed for an email account can conflict with another action performed on the same email message. In the case of different resources that have a dependency relationship, performing an action on one of the resources can affect how an action is performed for another resource. For example, an action performed on an email message folder can conflict with an action performed for an email account including that email message folder because a change in the email message folder may affect an action performed for the email account, which may include synchronizing email messages included in the email message folder.

In some embodiments, message management service 114 can implement a locking scheme, which can include preventing (e.g., blocking or postponing) execution of actions that conflict until other conflicting actions have been performed. In certain embodiments, serialization module 114 can perform non-conflicting actions concurrently to promote parallel processing of actions. Parallel processing of non-conflicting actions can improve system performance for services provided by message management service 102. Examples of certain embodiments of the techniques for serializing actions are described below with reference to FIGS. 4-11.

Clients 108 and 110 can be user-operated computing devices that can execute software to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions such as deferring messages in the user's inbox. For example, a user interface of client 108 can be configured to allow the user to indicate that a message should be deferred, e.g., by performing a specific gesture or other input operation. When the user indicates to client 108 that a particular message should be deferred, client 108 can communicate a deferral instruction to message management service 104, and message management service 104 can defer the message.

Client 110 can be a desktop computer that can execute an app to communicate with messaging service 102 without using message management service 104. This app can be, for example, a mail client app built into an operating system of a desktop computer, a web browser that interfaces with a web-based messaging service, a service-specific application provided by the provider of messaging service 102, or another app. Client 110 in examples described herein does not access message management service 104 and might or might not provide user input controls for enhanced functionality such as deferring messages.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or messaging services 102 and can link any or all of these accounts to a single account with message management service 104.

For purposes of illustration, specific embodiments are described herein for techniques for serializing account and message management actions performed by a message management service for synchronization with a message service provider. In accordance with embodiments of the present invention, any client device (e.g., client 108 and client 110) and messaging service 102 can use enhanced functionality available through message management service 104, such as serializing actions that involve synchronization between message management service 104 and messaging service 102. For instance, using client 108, the user can attempt to perform multiple actions for the user's account, which can cause message management service 104 to manage serializing those actions.

An illustrative example follows in which the user can use client 108 to attempt to perform an action to synchronize email messages between client 108 and messaging service 102 and subsequently, multiple actions (e.g., update and send) with respect to specific email messages. Message management service 104 can serialize actions to ensure that the actions are not performed concurrently with conflicting actions. The locking scheme can be used to determine whether multiple actions conflict and if so, an order in which to perform the actions. In this example, message management service 104 can determine that the action to synchronize the email account can conflict with the actions on the email messages because the email messages are dependent on the email account and may be updated during synchronization of the email account. Message management service 104 can accordingly obtain a resource lock for the email account action to prevent any other actions, such as the actions on the email messages, from being performed when the synchronization is performed for the email account.

Message management service 104 can reduce time for performing requested actions using the locking scheme to identify actions that do not conflict with each other (e.g., email messages, folders, or threads) so that the identified actions can be run in parallel. For example, if actions are requested to be performed for multiple email messages, message management service 104 can accordingly lock resources corresponding to each of those email messages and can concurrently perform the requested action corresponding to each email message because the those email messages do not have a dependency relationship. If other actions are received during this time, message management service 104 can apply the locking scheme to determine whether the other actions can be performed concurrently or whether the other actions conflict. For example, if an additional action is received for a different email message, message management service 104 can concurrently perform the additional action since the email message for the additional action is different and does not conflict with the other email messages that are locked.

It will be appreciated that system 100 is illustrative and that variations and modifications are possible. Embodiments of the present invention can support any number of client devices, including client devices belonging to or otherwise associated with different users. Further, in some embodiments, a message management service can interact with multiple messaging services and can manage messages of disparate types (e.g., email and social network messages).

Figure 2:
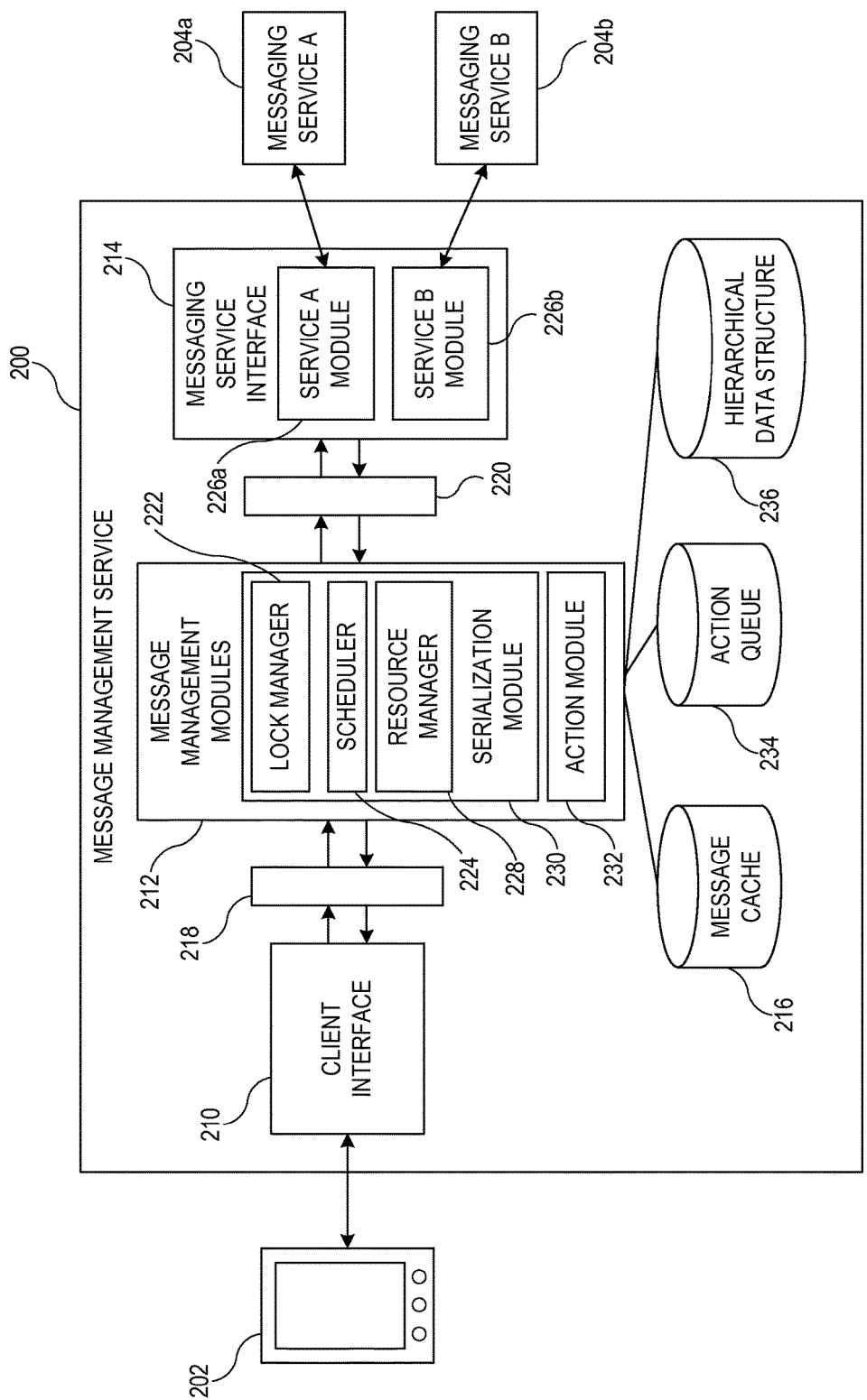
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between a client 202 (e.g., implementing client 108 or client 110 of FIG. 1) and various messaging services 204a, 204b (e.g., implementing messaging service 102 of FIG. 1). Each messaging service 204a, 204b can be a different messaging service, such as a different email service and a social network service, and so on. While two messaging services 204 are shown, any number of messaging services 204 can be supported by a single message management service 200.

Message management service 200 can include a client interface 210, message management modules 212, a messaging service interface 214, a message cache 216, an action queue 234, and a hierarchical data structure 236. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various instructions from client 202, such as a request to perform an action for an email account provided by messaging service 204a or messaging service 204b.

Message management modules 212 can include one or more functional blocks or modules configured to perform various operations on messages received by message management service 200, including outbound messages received from client 202 as well as inbound messages received from messaging services 204a, 204b. The functional blocks or modules can be configured to perform account-related and email-related actions requested by client 202 and/or messaging services 240a, 204b for synchronization with messaging service(s) 240a, 240b. Message management modules 212 can include a serialization module 230 (e.g., implementing serialization module 114 of FIG. 1) and action module 232. Serialization module 230 can include lock manager 222, scheduler 224, and resource manager 228.

Action module 232 can receive from client 202 and/or messaging service 204a, 204b a request to perform an action for a resource of an email account. As explained above, actions can include account-related actions, folder-related action, thread-related actions, message-related actions, or any other type of action can be performed for a resource of a message account. Action module 232 can identify the resource from the request. Action queue 234 can be used by action module 232 to store and obtain information about one or more actions that were requested earlier and that are scheduled to be performed at a later time. In certain embodiments, action module 232 can communicate with serialization module 230 to determine whether to perform a requested action or to serialize the requested action, which can include queuing the requested action to be performed at a later time when a resource becomes available. Action module 232 can remove an action (e.g., "dequeue an action") from action queue 234 at a later time when resources become available. Action module 232 can communicate with serialization module 230 to determine whether resources are available to process an action. In some embodiments, actions can be generally processed from action queue 234 in a first-in-first-out (FIFO) ordering based on resource availability. For example, action module 232 can check each queued action in the queue, in a FIFO order, and then execute the first queued action for which corresponding serialization locks can be obtained. Thus, actions can be removed from action queue 234 in a different order than the actions are stored depending on resource availability.

Resource manager 228 can manage information about resources for one or more email accounts. In some embodiments, resource manager 230 can manage information about an email account in a data structure such as hierarchical data structure 236. Hierarchical data structure 236 can be stored in a database or other data store. Hierarchical data structure 236 can be used by resource manager 230 to store information about resources corresponding to actions that can be performed for an email account. Information about resources can indicate dependency relationships with other resources for the same email account. Resource information can include lock state information indicating a resource's availability for an action. Hierarchical data structure 236 can be updated by resource manager 228 as resources and their corresponding dependency relationships change for an email account.

Lock manager 222 can manage access to resources for one or more email accounts. To control access to resources, lock manager 222 can manage a resource lock (referred to herein as a "a lock") for each resource of an email account. Information about the state of the lock can be managed in association with resource information included in hierarchical data structure 236. Lock manager 222 can manage acquiring and releasing of a lock for each resource in hierarchical data structure 236. Lock manager 222 can determine whether a lock can be acquired for a requested resource based on dependency relationships identified in hierarchical data structure 236.

In some embodiments, lock manager 222 can implement a locking scheme to serialize actions to prevent conflicting actions from being performed concurrently. Lock manager 222 can selectively block conflicting actions from being performed concurrently and can postpone operations for the conflicting actions until a conflicting action that is being performed has completed for a resource needed to perform a different conflicting action. For actions that do not conflict, lock manager 222 can enable a lock to be acquired for other resources for which non-conflicting actions can be performed concurrently. Examples of techniques of a locking scheme implemented by lock manager 222 are described below with reference to FIGS. 7-11.

Scheduler 224 can manage scheduling of requested actions to be performed for an email account. Scheduler 224 can store actions in action queue 234 for managing actions. In the event that a lock can be acquired for a resource identified for a requested action, scheduler 224 enable the action to be performed. In the event that an action is to be blocked, scheduler 224 can store information about the blocked action in action queue 234. In some embodiments, scheduler 224 can optimize performance of actions by performing actions concurrently. For example, actions that do not conflict can be performed concurrently. In some embodiments, scheduler 224 can identify actions that are stored in action queue 234 that can be performed concurrently with other actions that are being performed. Examples of scheduling actions are described below with reference to FIGS. 7 and 8. Certain embodiments of processes that can be implemented by scheduler 224 to optimize performance of actions are described with reference to FIGS. 10 and 11.

Messaging service interface 214 can include various service modules 226a, 226b, each of which can be configured to communicate with a different one of messaging services 204a, 204b. For example, different messaging services 204 may support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search.

Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management modules 212 can perform various operations on inbound and/or outbound messages.

In certain embodiments, message management modules 212 can perform actions requested by client 202 and/or messaging service 204. Action module 232 can receive requests to perform actions for an email account. Action module 232 can request serialization module 230 to determine whether a resource can be serialized such that a requested action can be performed without causing conflict with any other action. In the event that an action cannot be performed, the requested action can be placed in action queue 234 until a later time when the requested action does not conflict with another requested action. Serialization module 230 can instruct action module 232 at a later time when to perform one or more queued actions.

When requested to determine whether an action can be performed, resource manager 224 can identify information about a resource for a requested action to be performed. The identified resource can be provided to lock manager 222 to determine whether a lock can be obtained for the identified resource. Lock manager 224 can communicate a result about availability of the lock to scheduler 228. Based on the availability of the lock, scheduler 228 can determine whether an action is to be performed. In the event that the lock can be acquired, the requested action can be performed without causing a conflict with any other actions being performed. Scheduler 228 can request action module 232 to perform the action once a lock has been acquired. In the event that the lock cannot be obtained, scheduler 224 can place information about the action in action queue 234. By queuing the action to be performed at a later time, the action is selectively blocked such that it is postponed for execution.

It will be appreciated that message management service 200 is illustrative and that variations and modifications are possible. For example, other message management modules and/or operations can be provided. In some embodiments, the other message management modules can provide windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of attachments, synchronization with messaging services 204 (e.g., relaying instructions from client 202 to move or modify messages) and so on. In some embodiments, serialization module 230 can serialize actions performed by the other message management modules for an email account to provide the functions and features identified above.

As described above, message management service 200 can implement techniques for serializing actions performed for an email account. In certain embodiments, message management service 200 can manage hierarchical data structure 236 to implement the locking scheme to facilitate serializing actions. For example, one or more of message management modules 212, such as lock manager 222, can manage information corresponding to resources for an email account in the hierarchical data structure to implement the locking scheme. In some embodiments, resource manager 228 can generate hierarchical data structure 236 before message management service 200 begins operation to perform actions for an email account. In some embodiments, resource manager 228 can generate hierarchical data structure 236 as resources are identified for requested actions.

Figure 3:
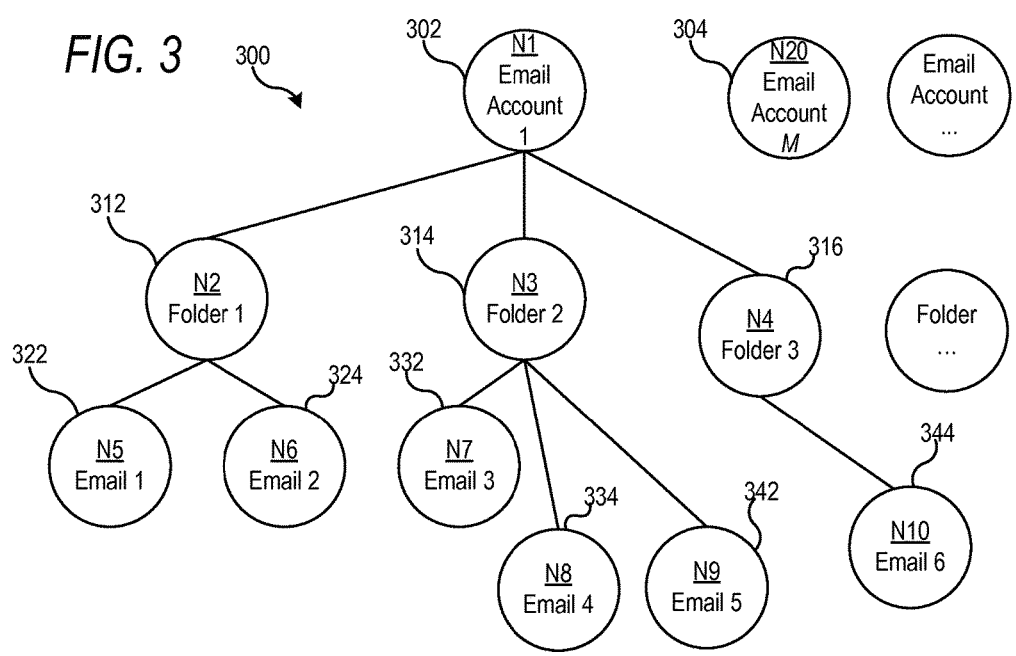
FIG. 3 shows an example of a hierarchical data structure for managing serialization of actions performed for a message account according to an embodiment of the present invention.
Figure 4:
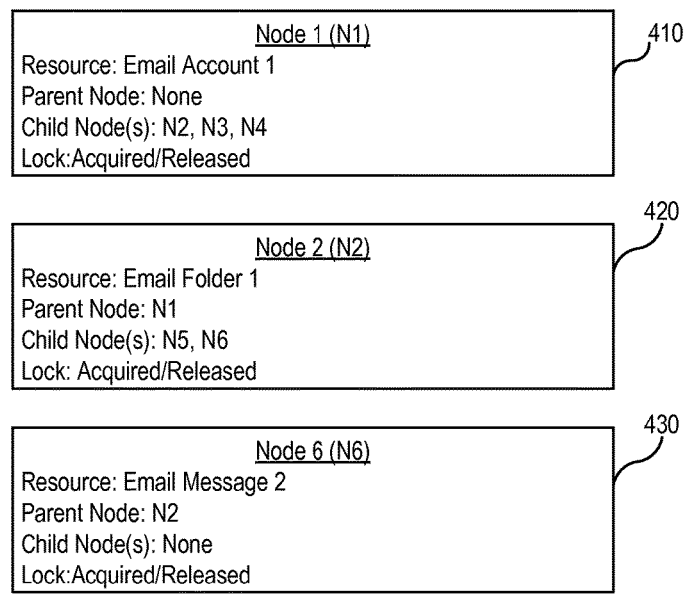
FIG. 4 shows an example of data structures included in a hierarchical data structure for managing serialization of actions performed for a message account according to an embodiment of the present invention.
Figures 5, 6:
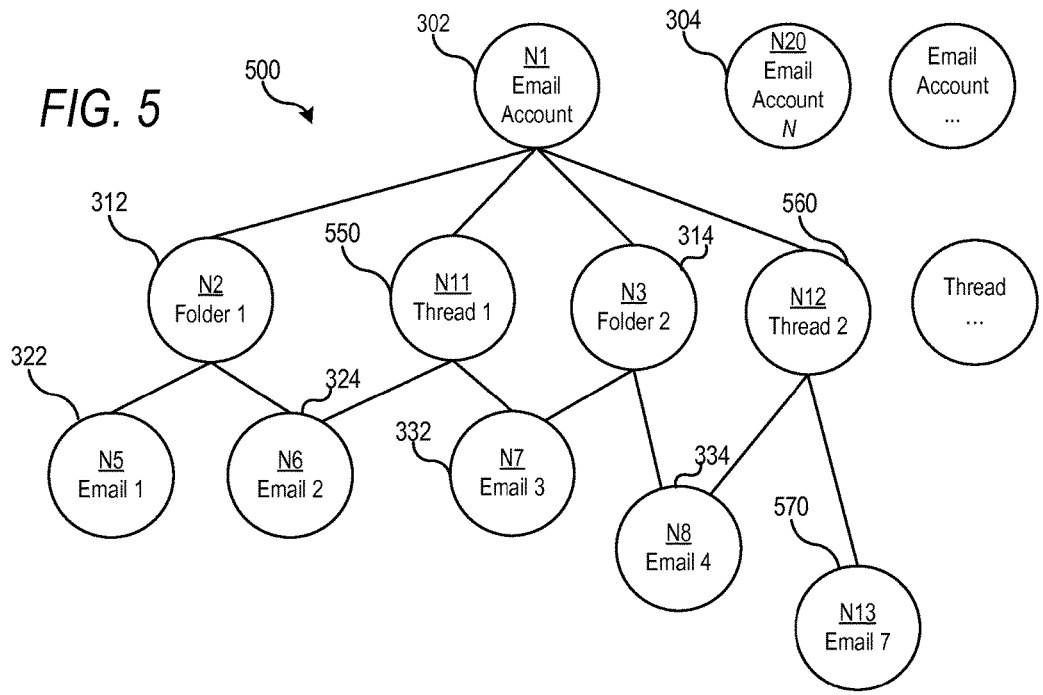
FIG. 5 shows another example of a hierarchical data structure for managing serialization of actions performed for a message account according to an embodiment of the present invention.
FIG. 6 shows another example of data structures included in a hierarchical data structure for managing serialization of actions performed for a message account according to an embodiment of the present invention.

FIGS. 3 and 5 show examples of a hierarchical data structure according to an embodiment of the present invention. FIGS. 4 and 6 show examples of data structures included in the hierarchical data structure of FIGS. 3 and 5, respectively.

FIG. 3 shows an example of data structure 300 (e.g., hierarchical data structure 236 of FIG. 2) for managing serializing actions performed for an email account. In certain embodiments, data structure 300 can be organized as a hierarchical data structure, such as tree data structure. In some embodiments, data structure 300 can be organized differently from a manner in which data structure 300 is illustrated and/or described herein with reference to FIG. 3. The different organization can still enable message management service 200 to manage serializing actions performed for an email account.

Data structure 300 can include a plurality of data structures, each data structure referred to herein as "a node." For example, data structure 300 can include node 1 (N1) 302, node 2 (N2), 312, node 3 (N3) 314, node 4 (N4) 316, node 5 (N5) 322, node 6 (N6) 324, node 7 (N7) 332, node 8 (N8) 334, node 9 (N9) 342, node 10 (N10) 344, and node 20 (N20) 304. Each node 302, 304, 312, 314, 316, 322, 324, 332, 334, 342, 344 can include information which corresponds to a different resource (e.g., an email account, an email folder, or an email message) in an email account for which actions can be performed. Although data structure 300 is illustrated with a certain number of nodes, data structure 300 can include more or fewer nodes based on the resources that are available for an email account. While data structure 300 is shown as including nodes corresponding to resources for multiple email accounts, a separate hierarchical data structure can be generated for resources in each email account. Examples of nodes are described below with reference to FIG. 4.

In some embodiments, data structure 300 can include multiple levels of nodes, each level including one or more nodes. Each level can include nodes corresponding to one or more types of resources for an email account. A node at one level can correspond to a resource that is different from a resource corresponding to a node at another level. Actions for the same resource or a dependent resource can conflict with each other. An action performed for a resource that corresponds to a node at one level can conflict with an action performed for a resource at another level if their respective nodes have a dependency relationship. Each resource can correspond to a node at a particular level and can have dependency relationships with other resources, such as a parent-child relationship, a grandparent-grandchild, or other degrees of relationships if more levels exist in data structure 300. The nodes in data structure 300 can be organized according to dependency relationships between their corresponding resources. For example, a node at one level in data structure 300 can have a dependency relationship with its ancestor node(s) (e.g., a parent, a grandparent, a great-grandparent, etc.) and/or its successor node(s) (e.g., a child, grandchild, great-grandchild, etc.) representing dependency relationships between those nodes' corresponding resources. Although data structure 300 is shown as having three levels, data structure 300 can include more or fewer levels. A number of levels in data structure 300 can be based on consideration such as a type of email account, a manner in which resources are dependent for a type of email account, or techniques by which serialization can be implemented.

In the example shown in FIG. 3, data structure 300 can include a first level of nodes, such as Ni 302 corresponding to an email account resource ("Email Account 1") for a first email account and N20 304 correspond to an email account resource ("Email Account M") of another email account. Each node at the first level can represent an account-level resource managed for an entire email account. Actions that can be performed at the account-level for an email account can correspond to a node at the first level, such as N1 302. Actions that map to an account-level can include synchronization of an email account and modifications to account settings or account-level information. Actions performed for account-level resources can require a serialization of an email account. An account-level resource such as an email account can correspond to a first-level node because resources such as email messages and email message folders are dependent on an email account when actions are performed for the email account. As such, actions to be performed to the email account should be serialized at the account-level to prevent conflicts with other actions to be performed for specific resources (e.g., folders, emails, or email threads) of the email account. Hence, specific resources for an email account can correspond to nodes at a lower level in data structure 300 described further below. A node for an email account can have a dependency relationship as an ancestor of each resource managed for the email account, such as nodes at each of the different levels in data structure 300 below the node for the email account. Thus, a first-level node can have multiple resources that correspond to nodes that are successor nodes of the first-level node. In the example of FIG. 3, all nodes below N1 302 are successor nodes of N1 302.

Data structure 300 can include a second level of nodes, such as N2 312 corresponding to an email message folder ("Folder 1"), N3 314 corresponding to an email message folder ("Folder 2"), and N4 316 corresponding to an email message folder ("Folder 3"). Each node of the second level can correspond to an email folder identified as a resource for an email account. Actions that can be performed on a folder of email messages can correspond to a node representing the folder. Actions that can be performed for a folder of email messages can include creating a folder, updating a folder, deleting a folder, or other actions that can be performed on folder of email messages. A second-level node for a resource, such as a folder, can have a dependency relationship as a child of a node at the first level corresponding to an account including the folder. A second-level node can also have a dependency relationship as a parent node of nodes of a lower level, such as a node representing a different email message in the folder corresponding to the second-level node. In the example of FIG. 3, N1 302 has a dependency relationship as an ancestor of each of N2 312, N3 314, and N4 316.

In data structure 300, a third level of nodes can includes one or more nodes, each corresponding to a different email address for a folder in an email account. In FIG. 3, the third level as shown includes node N5 322 corresponding to an email message ("Email 1"), N6 324 corresponding to an email message ("Email 2"), N7 332 corresponding to an email message ("Email 3"), N8 334 corresponding to an email message ("Email 4"), N9 342 corresponding to an email message ("Email 5"), and N10 344 corresponding to an email message ("Email 6"). Actions that can be performed for an email message of an email account can include creating an email message, sending an email message, deleting an email message, marking an email message as read/unread, or other actions performed on an email message. A third-level node corresponding to a resource, such as an email message, can have a dependent relationship as a successor of a node at the second-level corresponding to a folder that includes the email message and a successor of a node at the first-level corresponding to an email account that includes the folder and the email message. Thus, a third-level node can have multiple successor nodes, each of which corresponds to nodes at lower levels in data structure 300 which for which the first-level node (e.g., N1 302) has a dependency relationship. In the example of FIG. 3, N5 322 has a dependency relationship with N2 312 and N1 302, both of which are ancestors of N5 322.

A resource corresponding to a node of a particular level in data structure 300 can demand a different granularity of serialization for actions performed for the resource. Nodes at a higher level of data structure 300 (e.g., the first level of nodes shown in FIG. 3) can have coarse granularity for serializing actions for resources. Coarse granularity can demand more rather than fewer resources to be serialized before an action can be performed. For example, to perform an action on an email account, a node corresponding to the email account and each successor node of the node for the email account are serialized to prevent a conflict with the action on the email account. Nodes at a lower level of data structure 300 (e.g., the third level shown in FIG. 3) can have finer granularity of serialization such that a fewer resources are serialized before the action for a resource corresponding to a node at the third level can be performed. For example, to perform an action on an email message, a node for the email message and each ancestor node of the node for the email message are serialized. In some embodiments, resources on the same level can be performed in parallel so long as actions are not being performed for each resource that has a dependency relationship as an ancestor or a successor.

FIG. 4 shows an example of data structures ("nodes") included in data structure 300. Node 410 is an example of a first-level node (e.g., N1 302 of FIG. 3) in data structure 300. Node 420 is an example of a second-level node (e.g., N2 312 of FIG. 3) in data structure 300. Node 430 is an example of a third-level node (e.g., N5 322 of FIG. 3) in data structure 300. Node 410, node 420, and node 430 can each include information about a resource corresponding to that node. For example, a node in data structure 300 (e.g., node 410, node 420, or node 430) can include information identifying a name of a resource, a type of the resource, a lock state for the resource (e.g., acquired or released), and/or any dependency relationships with other nodes in data structure 300 (e.g., child node(s) and parent node(s)). In some embodiments, a node in data structure 300 can include a lock history that is updated with a timestamp each time there is a change in the lock state for the resource corresponding to the node. The information in a node can be maintained by any of message management modules 212. In some embodiments, each node in data structure 300 can include information indicating where each ancestor node and/or a successor node is stored in memory. Message management service 200 can use the information indicating the location in memory of ancestor and/or successor nodes to determine a lock state for a resource corresponding to each successor node and/or ancestor node when serialization is being performed.

The information included in each node of data structure 300 can enable message management service 200 to easily locate nodes corresponding to resources that have a dependency relationship, thereby reducing time for determining dependencies between resources when performing serialization. Data structure 300 can enable message management service 200 to reduce time for identifying resources that do not have a dependency relationship with each other so that actions can be scheduled to be performed in parallel for independent resources of an email account.

FIG. 5 shows an example of data structure 500 (e.g., hierarchical data structure 236 of FIG. 2) for managing serialization of actions performed for an email account. In certain embodiments, data structure 500 can be organized as a hierarchical data structure, such as a tree data structure. In some embodiments, data structure 500 can be organized differently from a manner in which data structure 500 is illustrated and/or described herein with reference to FIG. 5. The different organization can enable message management service 200 to serialize actions performed for an email account. For purposes of illustration, data structure 500 is shown including elements of FIG. 3 to illustrate nodes that can be included in data structure 500. However, in some embodiments, data structure 500 can include additional or different elements (e.g., nodes) than those shown in FIG. 3. FIG. 5 shows data structure 500 including information about resources including message threads (e.g., email message threads) associated with an email account.

Data structure 500 can include a plurality of data structures (e.g., nodes). In the example shown in FIG. 5, data structure 500 can include some or all nodes shown in FIG. 3, such as N1 302, N2 312, N3 314, N5 322, N6 324, N7 332, and N8 334, and additional nodes such as node 13 (N13) 570 corresponding to an email message ("Email 7"). Data structure 500 can include one or more nodes, each associated with a message thread of an email account. For example, data structure 500 can include node 11 (N11) 550 corresponding to an email thread ("Thread 1") and node 12 (N12) 560 corresponding to an email thread ("Thread 2"). N11 and N12 can each include information about a different email message thread for an email account for which actions can be performed. Although data structure 500 is illustrated with a particular number of nodes, data structure 500 can include more or fewer nodes based on the resources that are available for an email account. While data structure 500 is shown as including nodes for multiple email accounts, a different hierarchical data structure can be generated for each email account. Examples of a node corresponding to a message thread are described below with reference to FIG. 6.

Similar to data structure 300, data structure 500 can include multiple levels of nodes, each level including one or more nodes. A node at each level can correspond to a different type of resource for an email account. Actions on an identical resource or a resource having a dependency relationship can conflict with each other. An action performed for a resource that corresponds to a node at one level can conflict with an action performed for a resource corresponding to a node at another level if the respective nodes for the resources have a dependency relationship. Each resource can correspond to a node at a particular level and can have dependencies with other resources, such as parent-child relationship, a grandparent-grandchild, or other degrees of relationships if more levels exist in data structure 500. Although data structure 500 is shown as having three levels, data structure 500 can include more or fewer levels.

In the example shown in FIG. 5, data structure 500 can include a first level of nodes. In this instance, data structure 500 can include similar first-level nodes of data structure 300 such as N1 302 and N20 304. Each node at the first level can represent an account-level resource managed for an entire email account. An account-level resource such as an email account can correspond to a first-level node because resources for an email account such as folders, threads, and email messages have a dependency relationship with the email account, and therefore are serialized to avoid conflicts with other actions performed for the email account.

Data structure 500 can include a second level of nodes. In some embodiments, the second level can be similar to a second level of nodes in data structure 300. In the example shown in FIG. 5, data structure 500 can include some of the second-level nodes of data structure 300 shown in FIG. 3, such as N2 312 and N3 314. Additionally, in the example of FIG. 5, data structure 500 can include different second-level nodes, such as N11 550 and N12 560, each corresponding to an email message thread. Actions that can be performed for a thread of email messages can include creating a thread, deleting a thread, modifying a thread, or other actions that can be performed for a thread of email messages. A second-level node for a resource, such as an email message thread, can have a dependency relationship as a successor of a node at the first level for an email account. A second-level node corresponding to an email message thread can also have a dependency relationship as an ancestor of nodes at the third level such as each node representing a different email message in the email message thread. In the example of FIG. 5, N11 550 has a dependency relationship as a successor of N1 302 and a dependency relationship as an ancestor of N6 324 and N7 332. Also in the example of FIG. 5, N12 560 has a dependency relationship as a successor of N1 302 and a dependency relationship as an ancestor of N8 334 and N13 570.

In some embodiments, an email message thread can be designated as a second-level node similar to an email folder because it has a dependency relationship with an email account and one or more email messages. It can be appreciated that in other embodiments, data structure 500 can be arranged such that each node for an email message thread can be placed at different level below the first level. For example, nodes for email message threads can be placed at a fourth level below email messages to maintain the dependency relationship between email message threads and other resources of an email account.

In data structure 500, a third level of nodes can include one or more nodes, each corresponding to an different email address for a folder in an email account. In some embodiments, the third level can be similar to a third level of nodes in data structure 300. For example, data structure 500 can include N5 322, N6 324, N7 332, and N8 334. In the example shown in FIG. 5, data structure 500 can include other third level nodes such as N13 570. Actions that can be performed for an email message of an email account can include creating an email message, sending an email message, deleting an email message, marking an email message as read/unread, or other actions performed on an email message. A third-level node corresponding to a resource, such as an email message, can have a dependency relationship as a successor of a node at the second-level node for a folder and a first-level node of an account. Thus, a third-level node can have multiple ancestors, each of which correspond to a node at a higher level in data structure 500 to which the third-level node has a dependency relationship. In the example of FIG. 5, N5 322 has a dependency relationship as a successor of N2 312 and N1 302, both of which are ancestors of N5 322.

In some embodiments a third-level node (e.g., N6 324 and N7 332) can have a dependency relationship with multiple second level nodes. For example, a third-level node for an email message can depend on a node corresponding to a folder and a node corresponding to a message thread, both of which can include the email message. In the example shown in FIG. 5, N6 324 can have a dependency relationship as a successor of N2 312 and N11 550 because email 2 can be included in both the email message folder corresponding to N2 312 and the message thread corresponding to N11 550. Similarly, N7 332 and N8 334 can each have a dependency relationship with multiple second-level nodes. In such instances where a third-level node has multiple ancestors, message management service 200 can identify each ancestor when determining a dependency relationship for purposes of serialization.

A resource corresponding to a node of a particular level in data structure 500 can demand a different level of granularity for serializing actions performed for a resource. Similar to data structure 300, nodes at a higher level (e.g., first-level nodes in FIG. 5) can have coarse granularity for serializing actions for a node at the higher level compared to actions for a node at a lower level (e.g., third-level nodes in FIG. 5) can have finer granularity of serialization for resources at the lower level. In the example shown in FIG. 5, third-level nodes can have a finer granularity even though an email message can have a dependency relationship with a folder and a message thread, because less resources are serialized for an action for the email message in comparison to resources serialized for an action for an email account corresponding to a node at the account-level.

FIG. 6 shows an example of data structures ("nodes") included in data structure 500. Node 610 is an example of a second-level node (e.g., N11 550 of FIG. 5) in data structure 500. Node 620 is an example of a second-level node (e.g., N12 560 of FIG. 5) in data structure 500. In this example, node 610 and node 620 are examples of a node that can correspond to an email message thread for an email account. In some embodiments, a data structure for an email message thread can include similar information as other nodes in data structure 500. In FIG. 6, a node in data structure 500 (e.g., node 610 and node 620) can include information identifying a name of a resource, a type of the resource, a lock state for the resource (e.g., acquired or released), an email message ID of each email message in the corresponding message thread, and/or a dependency relationship with other nodes in data structure 500 (e.g., child node(s) and parent node(s)). In some embodiments, a node in data structure 500 can include a lock history that is updated with a timestamp each time there is a change in the lock state for the resource corresponding to the node. The information in a node can be updated and managed by one or more message management modules 212.

Figure 7:
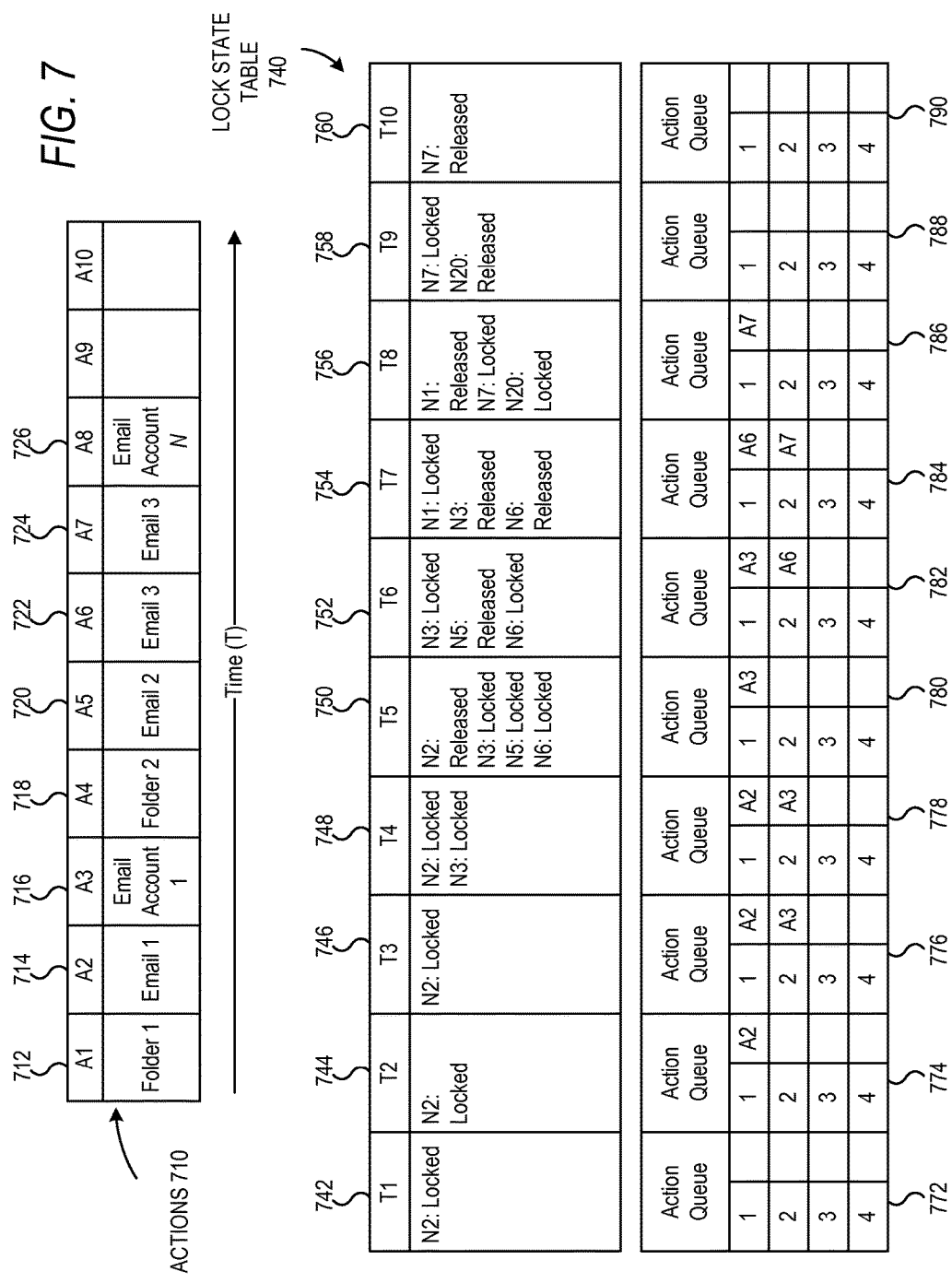
FIG. 7 shows an example of serializing actions performed for a message account according to an embodiment of the present invention.
Figure 8:
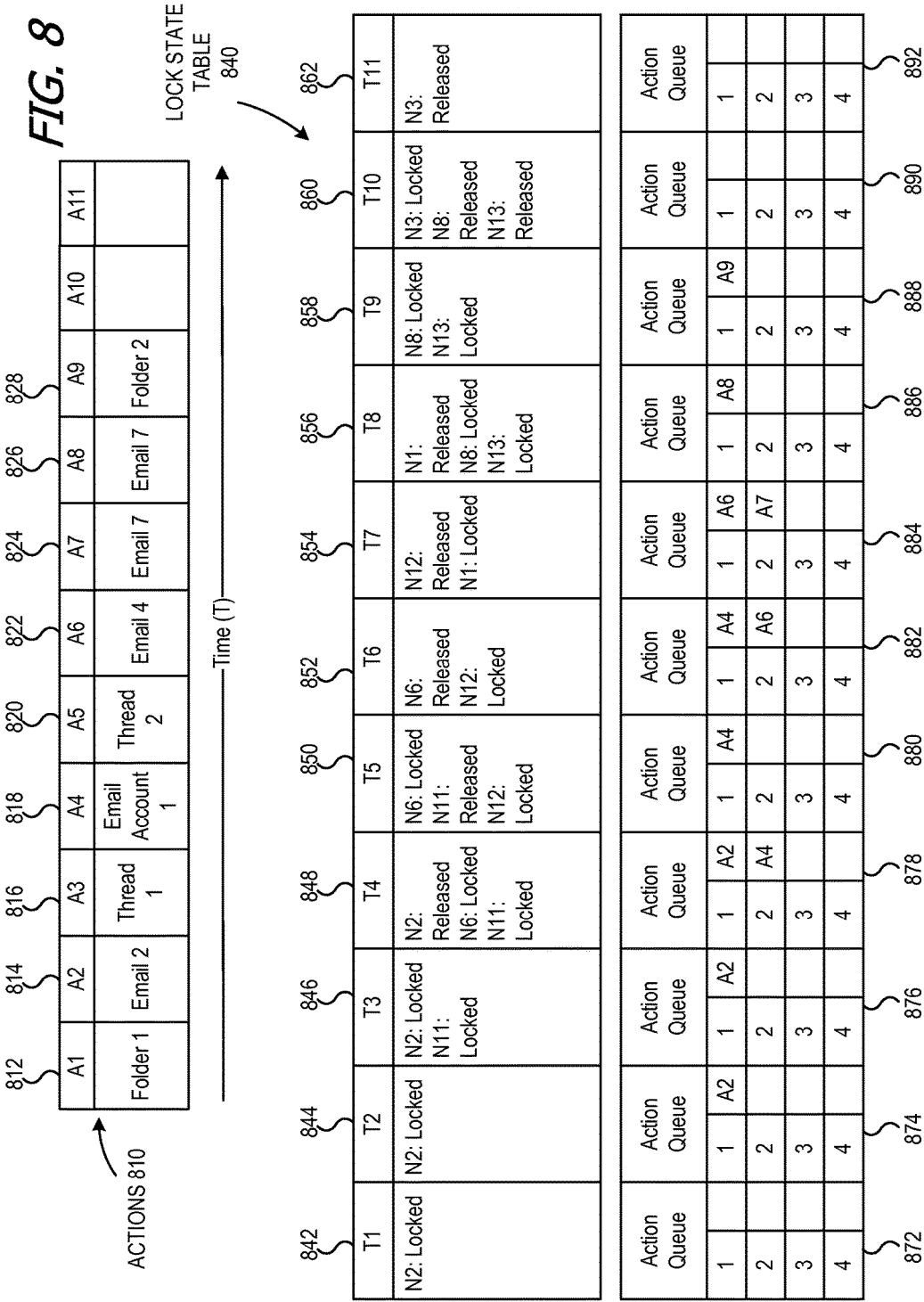
FIG. 8 shows an example of serializing actions performed for a message account according to an embodiment of the present invention.

FIGS. 7 and 8 show examples of serializing actions performed for a message account at message management service 200 of FIG. 2 according to an embodiment of the present invention. Specifically, FIG. 7 shows an example of serializing actions performed for an email account at discrete intervals of time T1-T10. The actions are requested to be performed for resources of the message account identified in data structure 300 of FIG. 3. Lock state table 740 has entries 742-760, each showing a current state of locks that have changed at discrete intervals of time T1-T10. Actions 710 shows different actions (A) requested at a particular time to be performed at message management service 200 for an email account. Each action can identify an action to be performed for an email account and a resource to which the action is to be performed. Below lock state table 740, contents of an action queue (e.g., action queue 234 of FIG. 2)—is shown at each time.

At time 1 (T1), message management service 200 can receive a request to perform action 1 (A1) 712 for a resource ("Folder 1") for the email account at message management service 200. In certain embodiments, each requested action can identify the email account for which the action is to be performed. Message management service 200 can examine data structure 300 starting at N1 302 corresponding to the email account to identify a node for a resource indicated by a requested action. At T1, N2 312 can be identified corresponding to a resource ("Folder 1"). Message management service 200 can use data structure 300 to identify each node N1 302, N5 322, and N6 324, which has a dependency relationship as an ancestor or a successor of N2 312. Message management service 200 can examine N2 312 and each of the identified nodes N1 302, N5 322, and N6 324 to determine whether a lock has been acquired for N2 312 and at least one of N1 302, N5 322, and N6 324.

At T1, message management service 200 can acquire a lock for N2 312 because a lock has not been acquired for each identified node N1 302, N5 322, and N6 324. Because a lock is has not been acquired for N2 312, the ancestor node N1 302, and the successor nodes N5 322 and N6 324, message management service 200 can be assured that performing A1 712 will not conflict with any other action that is being performed for the email message account since the lock has not been acquired for nodes having a dependency relationship with N2 312. In lock state table 740, entry 742 identifies that the lock has been acquired for N2 312. At T1, action queue 772 can be empty as shown. In some embodiments, an action queue (e.g., action queue 234) can include actions that have been queued to be performed at a later time when a lock is available.

At time 2 (T2), message management service 200 can receive a request to perform action 2 (A2) 714 for an email message ("Email 1") for the email account at message management service 200. Message management service 200 can examine data structure 300 for a node, such as N5 322, which corresponds to the email message ("Email 1"). Using data structure 300, message management service 200 can identify each node N1 302 and N2 312, which has a dependency relationship as an ancestor or a successor of N5 322. At T2, entry 744 in lock state table 740 shows a lock is still acquired for N2 312 to enable A1 712 to be performed. Message management service 200 can acquire a lock for N5 322 if a lock is not acquired for each ancestor node N1 302, each successor node N2 312, and N5 322. Message management service 200 cannot acquire a lock for N5 322 because a lock remains acquired for ancestor node N2 312. Since a lock cannot be acquired, message management service 200 can place information about A2 714 in action queue 774.

At time 3 (T3), message management service 200 can receive a request to perform action 3 (A3) 716 for a resource ("Email Account 1"). Message management service 200 can search data structure 300 for a node, such as N1 302, which corresponds to resource ("Email Account 1"). Using data structure 300, message management service 200 can identify each node N2-N10 312, 314, 316, 322, 324, 332, 334, 342, 344, which has a dependency relationship as an ancestor or a successor of N1 302. At T3, entry 746 in lock state table 740 shows that a lock is acquired for N2 312 for performing A1 712. Message management service 200 cannot acquire a lock for N1 302 because a lock remains acquired for N2 312, which has a dependency relationship with N1 302 as an ancestor. Since a lock cannot be acquired, message management service 200 can place information about A3 716 in action queue 776 with A2 714. Action queue 774 can include other actions, such as A2 714, which was stored during a previous time period. Message management service 200 can determine whether each action already stored in action queue 774 can be performed. At T3, A2 714 cannot be performed because N2 312, which has a dependency relationship with N5 322 identified by A2 714, has a lock. Thus, A2 714 remains in action queue 714.

At time 4 (T4), message management service 200 can receive a request to perform action 4 (A4) 718 for a resource ("Folder 2"). Message management service 200 can search data structure 300 for a node, such as N3 314, which corresponds to the resource ("Folder 2"). Using data structure 300, message management service 200 can identify each node N1 302, N7 332, N8 334, and N9 342, which has a dependency relationship as an ancestor or a successor of N3 314. At T4, entry 748 in lock state table 740 shows that a lock is still acquired for N2 312 to enable A1 712 to be performed. Message management service 200 can acquire a lock for N3 316 because entry 748 in lock state table 740 shows that a lock has not been acquired for each ancestor node (e.g., N1 302), each successor node (e.g., N7 332, N8 334, and N9 342), and N3 316. An action performed for the resource (Folder 1") corresponding to N2 312 does not conflict with an action performed for a resource corresponding to N3 314. Actions for different folders can be performed concurrently because there is no resource dependency relationship as identified by data structure 300. If action queue 776 were to include other actions for a resource (e.g., "Folder 3" corresponding to N4 316) that does not have a dependency relationship with a locked resource, message management service 200 can perform those actions in the action queue. At T4, action queue 778 includes A2 714 and A3 716 because entry 748 in lock state table 740 shows that the lock acquired for N2 312 has not been released. N2 312 has a dependency relationship with each node corresponding to a resource identified by A2 714 and A3 716.

At time 5 (T5), message management service 200 can receive a request to perform action 5 (A5) 720 for a resource ("Email 2") for the email account at message management service 200. Message management service 200 can search data structure 300 for a node, such as N6 324, which corresponds to the resource ("Email 2"). Using data structure 300, message management service 200 can identify each node N1 302 and N2 312, which has a dependency relationship as an ancestor or a successor of N6 324. At T5, entry 750 in lock state table 740 shows that a lock is released for N2 312, but that N3 314 remains locked because A4 718 is being performed. Message management service 200 can acquire a lock for N6 324 because entry 750 in lock state table 740 shows that a lock is not acquired for each ancestor node (e.g., N1 302 and N2 312) and N6 324. Performing A5

720 would not cause conflict with A4 718 because N6 324 does not have a dependency relationship with N3 314.

At T5, message management service 200 can remove A2 714 from action queue 778 because a lock can be acquired for a resource (e.g., "Email 1") for A2 714. A lock can be acquired for N5 322 because locks have not been acquired for N5 322 or for any nodes (e.g., N2 312 and N1 302) having a dependency relationship with N5 322. Since no actions are being performed for N5 322 or ancestor nodes N1 302 and N2 312, A2 714 can be performed. A lock can be acquired for N5 322 and N6 324, respectively, because A2 714 and A5 720 are both directed to an email message, each of which do not have a dependency relationship with each other.

At time (T6), a request is received to perform action 6 (A6) 722 for a resource ("Email 3"). The resource can correspond to N7 332. A lock cannot be acquired for N7 332 because N7 332 has a dependency relationship with N3 314 which remains locked at T6 (according to entry 752 in lock state table 740) because A4 718 is being performed. Information about A6 722 is added to action queue 782. N6 324 remains locked because A5 720 is being performed. A3 716 remains in action queue 782 because a lock for each of N3 314 and N6 324 remains acquired (according to entry 752 in lock state table 740) and both N3 314 and N6 324 have a dependency relationship with N1 302, which corresponds to a resource identified by A3 716. Hence, A3 716 remains in action queue 752 at T6.

At time 7 (T7), a request is received to perform action 7 (A7) 724 for a resource ("Email 3"). At this time, the lock for N3 314 and N6 324 are released because A4 718 and A5 720 have been performed. A lock can be acquired for N7 332 which corresponds to a resource for A7 724. A lock for N7 332 can be acquired because the lock for N7 332 and its ancestors N3 314 and N1 302 are available. Action queue 784 can include A3 716 that was previously stored in action queue 782. In some embodiments, message management service 200 can process actions in a FIFO order. In the example shown in FIG. 7, message management service 200 can remove A3 716 from action queue 784 to be performed before A6 722 and A7 724 because A3 716 was received first before A6 722 and A7 724 were received. The lock for N1 302 is acquired enable A3 716 to be performed at T3. Since the lock for N1 302 is acquired, the lock for N7 332 cannot be acquired as it is a successor of N1 302. Hence, A7 724 is placed on action queue 784 with A6 722. Entry 754 in lock state table 740 shows the change in locks after T7 is complete.

At time 8 (T8), a request is received to perform action 8 (A8) 726 for a resource ("Email Account M"). The resource indicated by A8 726 can correspond to N20 304. Because N20 304 is not locked and corresponds to a different email account than the email account corresponding to N1 302, the lock for N20 304 can be acquired, as shown in entry 756 of lock state table 740. At this time, the lock for N1 302 can be released because A3 716 has been performed. Entry 756 in lock state table 740 shows that the lock for N1 302 has been released. Since entry 756 in lock state table 740 shows that no nodes have been locked for nodes related to N1 302 and N7 332, N7 332 can be locked to enable A6 722 to be performed. Accordingly, A6 722 is dequeued from action queue 786. However, because A7 724 is to be performed for the same resource as A6 722, A7 724 must wait until the lock for N7 332 is released.

At time 9 (T9), no request is received to perform an action. The lock for N7 332 is released because A6 722 has been performed. Entry 758 in lock state table 740 shows that N20 remains locked because A8 726 is being performed. A7 724 can be dequeued from action queue 788 because the lock for N7 332 has been released. The lock for N7 332 is further acquired to enable A7 724 to be performed. Entry 758 in lock state table 740 shows that N7 332 remains locked because the lock was acquired for A7 724.

At time 10 (T10), no request is received to perform an action. A7 724 has performed so N7 332 is released. Action queue 790 includes no actions to dequeue. Processing can end after T10. Entry 760 in lock state table 740 shows that no changes in locks have occurred. The serialization process shown in FIG. 7 can end after T10.

Now turning to FIG. 8, an example is shown of serializing actions performed for a message account at discrete intervals of time T1-T11. The actions are requested to be performed for resources of the message account identified in data structure 500 of FIG. 5. Lock state table 840 has entries 842-862, each showing a current state of locks that have changes at discrete intervals of time T1-T11. Actions 810 shows different actions (A) requested at a particular time to be performed at message management service 200 for an email account. Each action can identify an action to be performed for an email account and a resource to which the action is to be performed. Shown below lock state table 840 are contents of an action queue (e.g., action queue 234 of FIG. 2) is shown over T1-T11.

At time 1 (T1), message management service 200 can receive a request to perform action 1 (A1) 812 for a resource ("Folder 1") for the email account at message management service 200. Message management service 200 can examine data structure 500 of FIG. 5 starting to identify a node for a resource indicated by a requested action. At T1, N2 312 can be identified corresponding to a resource ("Folder 1"). Message management service 200 can use data structure 500 to identify each node N1 302, N5 322, and N6 324, which has a dependency relationship as an ancestor or a successor of N2 312. By inspecting each identified node, message management service can determine whether a lock has been acquired for N2 312 identified in the requested action and at least one identified node N1 302, N5 322, and N6 324.

At T1, message management service 200 can acquire a lock for N2 312 because a lock has not been acquired for each identified node N1 302, N5 322, and N6 324. Because a lock is not currently acquired for N2 312 and the ancestor node N1 302 and the successor nodes N5 322 and N6 324, message management service 200 has assured that performing A1 812 will not conflict with any other action that is being performed for the email account. In lock state table 840, entry 842 identifies that the lock has been acquired for N2 312. At T1, action queue 872 can be empty as shown.

At time 2 (T2), message management service 200 can receive a request to perform action 2 (A2) 814 for a resource ("Email 2") for the email account at message management service 200. Message management service 200 can search data structure 500 for a node, such as N6 324, which corresponds to the resource ("Email 2"). Using data structure 500, message management service 200 can identify each node N1 302, N2 312, and N11 550, which has a dependency relationship as an ancestor or a successor of N6 324. At T2, entry 844 in lock state table 840 shows a lock is still acquired for N2 312 to enable A1 812 to be performed. Message management service 200 can acquire a lock for N6 324 if a lock is not acquired for N6 324, each ancestor node N1 302 and N11 550, and each successor node N2 312, and N5 322. Message management service 200 cannot acquire a lock for N6 324 because a lock remains acquired for ancestor node N2 312. Since a lock cannot be acquired, message management service 200 can place information about A2 814 in action queue 874.

At time 3 (T3), message management service 200 can receive a request to perform action 3 (A3) 816 for a resource ("Thread 1"). Message management service 200 can search data structure 500 for a node, such as N11 550, which corresponds to the resource ("Thread 1"). Using data structure 500, message management service 200 can identify each node N1 302, N6 324, and N7 332, which has a dependency relationship as an ancestor or a successor of N11 550. At T3, entry 846 in lock state table 840 shows that a lock is still acquired for N2 312 to enable A1 812 to be performed. Message management service 200 can acquire a lock for N11 550 because entry 846 in lock state table 840 shows that a lock has not been acquired for each ancestor node (e.g., N1 302), each successor node (e.g., N6 324 and N7 332). Entry 846 in lock status table 840 is updated to indicate the lock acquired for N11 550. An action performed for the resource ("Folder 1") corresponding to N2 312 does not conflict with an action performed for a resource corresponding to N11 550.

Actions for different folders can be performed concurrently because there is no resource dependency relationship as identified by data structure 500. If action queue 876 were to include other actions for a resource (e.g., "Folder 2" corresponding to N3 314 or "Thread 2" corresponding to N12 560) that does not have a dependency relationship with a resource that is locked, message management service 200 can perform those actions in the action queue. At T3, action queue 876 includes A2 814 because entry 846 in lock state table 840 shows that the lock acquired for N2 312 has not been released. N2 312 has a dependency relationship with nodes corresponding to resources for A2 814.

At time 4 (T4), message management service 200 can receive a request to perform action 4 (A4) 818 for a resource ("Email Account 1"). Message management service 200 can search data structure 500 for a node, such as N1 302, which corresponds to resource ("Email Account 1"). Using data structure 500, message management service 200 can identify each node which has a dependency relationship as an ancestor or a successor of N1 302. At T4, entry 848 in lock state table 840 shows that the lock is released for N2 312. Because the lock is released for N2 312, but the lock for N11 550 is acquired, the lock for N6 324 cannot be acquired because an ancestor of N6 324 is still locked. Action queue 878 shows that A2 814 remains in the queue. Message management service 200 cannot acquire a lock for N1 302 because a lock remains acquired for successor node N11 550. Entry 848 in lock status table 840 shows that a lock is still acquired for N11 550. Since a lock cannot be acquired, message management service 200 can place information about A4 818 in action queue 878 with A2 814.

At time 5 (T5), message management service 200 can receive a request to perform action 5 (A5) 820 for a resource ("Thread 2"). Message management service 200 can search data structure 500 for a node, such as N12 560, which corresponds to the resource ("Thread 2"). Using data structure 500, message management service 200 can identify each node N1 302, N8 334, and N13 570, which has a dependency relationship as an ancestor or a successor of N12 560. At T3, entry 850 in lock state table 840 shows that a lock is released for N11 550 and that a lock is acquired for N6 324 because the lock for N11 550 is no longer acquired. Message management service 200 can acquire a lock for N12 560 because entry 850 in lock state table 840 shows that a lock has not been acquired for each ancestor node (e.g., N1 302), each successor node (e.g., N7 332 and N13 570). Entry 850 in lock status table 840 is updated to indicate the lock acquired for N12 560. A4 818 remains in action queue 880 because a lock is acquired by at least one ancestor of N1 302 although the lock for N1 302 is not acquired.

At time 6 (T6), message management service 200 can receive a request to perform action 6 (A6) 822 for a resource ("Email 4"). Message management service 200 can search data structure 500 for a node, such as N8 334, which corresponds to the resource ("Email 4"). Using data structure 500, message management service 200 can identify each node N1 302, N3 314, and N12 560, which has a dependency relationship as an ancestor or a successor of N8 334. At T6, entry 852 in lock state table 840 shows that a lock is released for N6 324, but that N12 560 remains locked because A5 820 is being performed. Thus, message management service 200 cannot acquire a lock for N8 334 because a lock is acquired for an ancestor (e.g., N12 560) of N8 334. A6 822 is placed in action queue 882. Message management service 200 cannot acquire a lock for N1 302 because entry 852 in lock state table 840 shows that a lock is acquired for at least one ancestor node (e.g., N12 560) of N1 302.

At time (T7), a request is received to perform action 7 (A7) 824 for a resource ("Email 7"). The resource can correspond to N13 570. Here, the lock for N12 560 is released because A5 820 has been performed. Entry 854 in lock state table 840 indicates that N12 560 has been released. However, because A4 818 is dequeued from action queue 884 because the lock for N1 302 can be acquired. Since the lock is released for N12 560, no locks are acquired for ancestors of N1 302, thereby permitting the lock for N1 302 to be acquired. However, actions A7 824 and A6 822 cannot be performed because a lock cannot be acquired for N8 334 and N13 570, both of which have a dependency relationship with N1 302. Thus, A6 822 in action queue 884 and A7 824 is placed in action queue 884.

At time (T8), a request is received to perform action 8 (A8) 826 for a resource ("Email 7"). The resource can correspond to N13 570. At T8, entry 856 in lock state table 840 indicates that the lock for N1 302 has been released. Since the lock for N1 302 is released, message management service 200 can performs actions A6 822 and A7 824 because the lock for N8 334 and N13 570 can be acquired. N8 334 and N13 570 have a dependency relationship with N1 302, which has been released. Entry 856 shows that the lock for N8 334 and N13 570 is acquired. However, A8 826 cannot be performed because the lock for N8 334 has already been acquired for a previous action requested on the same resource ("Email 7"). Thus, A8 826 is place in action queue 886.

At time 9 (T9), a request is received to perform an action 9 (A9) 828 for a resource ("Folder 2"). The resource can correspond to N3 314. At T9, entry 858 in lock state table 840 indicates that the lock for N8 334 remains locked and that the lock for N13 570 remains locked. N3 314 is an ancestor of N8 334, which remains locked, so A9 828 is placed in message queue 888. At T9, N13 is initially released because A7 824 is performed, but then N13 570 is locked to perform A8 826, which is dequeued from action queue 888.

At time 10 (T10), no request is received to perform an action. A6 822 and A8 826 are doing being performed, so the lock for N8 334 and N13 570 are released, as shown in entry 860 of lock state table 840. Since no other locks have been acquired, N3 314 can be acquired to enable A9 828 to be dequeued from action queue 890 and performed once the lock is acquired. At time 11 (T11), A9 828 has been performed and no new actions are requested to be performed. Entry 862 in lock state table 840 indicates that the lock for N3 314 is released and that no other nodes are locked. Message queue 892 is empty because no new actions are received and currently pending actions have been performed. At time 11 (T11), no request is received to perform an action. The serialization process shown in FIG. 8 can end after T11.

By implementing a serialization mechanism shown in FIGS. 7 and 8 using a hierarchical data structure (e.g., data structure 300 and data structure 500), message management service 200 is able to quickly identify resource dependencies for prevent conflicting actions from being performed. Message management service 200 can schedule actions to be performed in parallel for resources that do not have a dependency relationship and/or for resource which a lock can be acquired without waiting for other conflicting actions to be performed.

Figure 9:
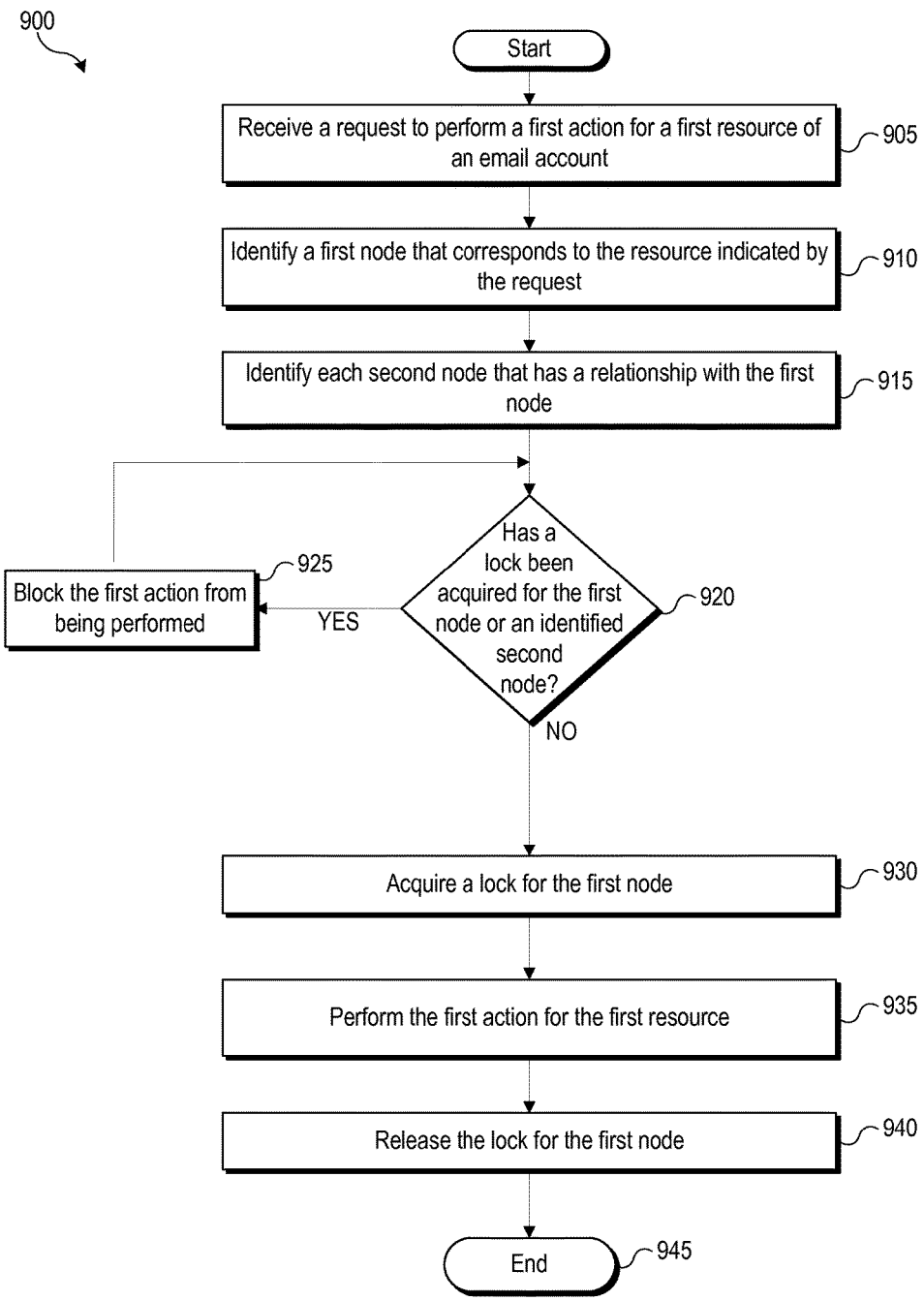
FIG. 9 shows a flow diagram of a process for serializing an action performed for a message account according to an embodiment of the present invention.

When a client (e.g., client 202) requests message management service 200 to perform an action for an email account, it can be useful to serialize the requested action by preventing the requested action from being performed when other actions are being performed for an email account. FIG. 9 shows a flow diagram of a process 900 for serializing an action performed for a message account according to an embodiment of the present invention. Process 900 can be performed by a message management service (e.g., message management service 200 of FIG. 2).

Process 900 can begin at block 905 when message management service receives a request to perform an action for a resource of an email account provided by a messaging service (e.g., messaging service 204 of FIG. 2). For example, a user operating a client (e.g., client 202) can perform an action at the client, such as swiping a message to delete a message. The action performed on the client can cause the client to send a request to message management service 200 to delete an email message corresponding to the swipe action. At this stage, message management service may have already begun performing an action for the same resource indicated by the request or performing an action for a different resource. In some instances, the different resource can have a dependency relationship with the resource indicated by the request.

At block 910, process 900 can identify a node in a hierarchical data structure that corresponds to the resource indicated by the request. For example, message management service 200 can examine a hierarchical data structure (e.g., hierarchical data structure 300 of FIG. 3) to identify a node that corresponds to the resource indicated by the received request.

At block 915, process 900 can identify each node in the hierarchical data structure that corresponds to a different resource of the email account. For example, message management service can examine hierarchical data structure 300 to identify each node that has a dependency relationship (e.g., an ancestor or a successor) with the node corresponding to the resource indicated by the request. Each identified node can correspond to a resource that has a dependency relationship with the resource identified by the request. The dependency relationship can indicate resources that can conflict if actions were to be performed concurrently for the resources. For example, an email message (e.g., "Email 1" corresponding to N5 322 of FIG. 3) can have a dependency relationship with a folder (e.g., "Folder 1" corresponding to N2 312) that includes the email message and the email account (e.g., "Email Account 1" corresponding to N1 302) to which the email belongs. In this example, N5 322 corresponding to the email message, N2 312 corresponding to the folder, and N1 302 corresponding to the email account can have a dependency relationship with each other because of the dependency relationship between the nodes for the resources.

At block 920, process 900 can determine whether a lock has been acquired for the node corresponding to the resource indicated by the request and at least one identified node. Message management service 200 can examine lock state information included in the node and at least one identified node to determine whether a lock has been acquired for the node and at least one identified node. In the example described above at block 915, message management service 200 can determine whether a lock has been acquired for N5 322, N2 312, and N1 302. If it is determined that a lock has been acquired by the node (e.g., N5 322) or the at least one identified node (e.g., N2 312 or N1 302), then process 900 can proceed to block 925 where the requested action can be blocked from being performed. If it is determined that a lock has not been acquired by the node (e.g., N5 322) and each identified node (e.g., N2 312 and N1 302), then process 900 can proceed to block 930.

At block 930, process 900 can acquire a lock for the node identified for the requested action. For example, message management service can obtain a lock for the resource indicated by the requested action. The lock can prevent message management services 200 from performing actions for the locked resource or any other resources that have a dependency relationship on the locked resource. At block 935, process 900 can perform the requested action once the lock has been acquired for the node. At block 940, process 900 can release the lock for the node once the action is performed. Process 900 can proceed to end (at block 945).

It will be appreciated that process 900 is illustrative and that variations and modifications are possible. Steps described as sequential may be executed in parallel, order of steps may be varied, and steps may be modified, combined, added or omitted. Process 900 can be performed for requested action that is received. It should be noted that process 900 can be performed concurrently with other requested actions that are received. In the event that two requested actions can conflict when performed, process 900 can acquire a lock based on which execution of process 900 is able to obtain a lock first. Further, while process 900 is described as being implemented in a message management service that acts as an intermediary between a messaging service and a user-operable client, those skilled in the art with access to the present disclosure will appreciate that process 900 or a similar process can also be implemented in a messaging service, allowing the messaging service itself to serialize actions performed for a message account.

Figure 10:
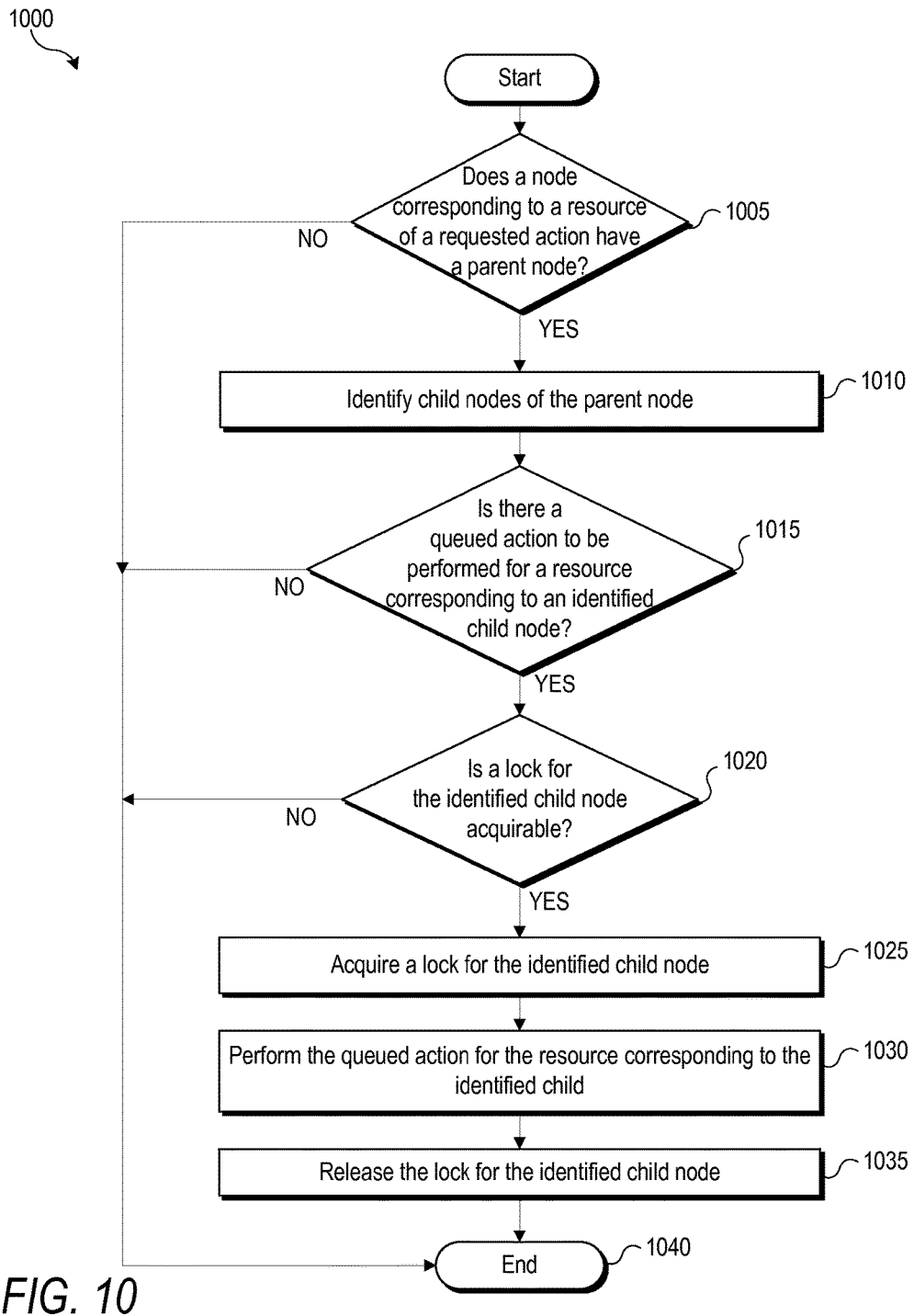
FIG. 10 shows a flow diagram of a process for concurrently performing actions for a message account according to an embodiment of the present invention.

FIG. 10 shows a flow diagram of a process 1000 for concurrently performing actions for a message account according to an embodiment of the present invention. Process 1000 can be performed by a message management service (e.g., message management service 200 of FIG. 2).

In some embodiments, process 1000 can identify other requested actions that be performed concurrently with the requested action performed by process 900. Process 1000 can be initiated after process 900 of FIG. 9 has acquired a lock for a node at block 930. Process 1000 can identify other actions to be performed on other resources on the same level as the resource corresponding to the node for which the lock was acquired in process 900. Serializing an action for a resource (e.g., an email message) in process 900 can prevent actions from being performed for other resources (e.g., an email folder or an email account) that have a dependency relationship as an ancestor of the resource that is serialized by process 900. So long as actions are blocked from being performed for ancestors of the resource serialized by process 900, additional actions can be concurrently performed for other resources (e.g., email messages) of a node on the same level as the resource serialized by process 900. Thus, process 1000 can optimize scheduling of non-conflicting actions (e.g., actions for different email messages) to be performed in parallel or concurrently.

Beginning at block 1005, process 1000 can determine whether a node, corresponding to a resource of a requested action, has a parent node in a hierarchical data structure (e.g., data structure 300 of FIG. 3). For example, a user operating a client can cause client 202 of FIG. 2 to request an action to be performed for an email message corresponding to a node (e.g., N5 322) managed in hierarchical data structure 300 by message management service 200. Continuing with the example, message management service 200 can determine whether the node corresponding to the email message has a parent node in hierarchical data structure 300. If it is determined that the node does not have a parent node, process 1000 can end (at block 1040). If it determined that the node has a parent, process 1000 can proceed to block 1010 to identify child nodes (e.g., N6 324) of the parent node (e.g., N2 312). In this instance, the node has a parent node N2 312.

At block 1015, process 1000 can determine whether there are any queued actions for a resource (e.g., an email message) corresponding to the child node (e.g., N6 324). In certain embodiments, action queue 234 can be examined to identify any actions that are to be performed for the resource corresponding to the identified child node. If it is determined that there is no queued action for the resource corresponding to the child node, process 1000 can end (at block 1040). If it is determined that a queued action exists for the resource corresponding to the child node, then process can proceed to block 1020. In some embodiments, a child node corresponding to an email message can have a dependency relationship with multiple parent nodes, such as a node corresponding to an email folder and a node corresponding to an email thread. In such embodiments, determining whether a lock is acquirable can include determining whether a lock has been acquired for both ancestors of a child node.

At block 1020, process 1000 can determine whether a lock is acquirable for an identified child node. A lock can be acquirable if a lock is not acquired for the child node and is not acquired for any successor nodes and any ancestor nodes of the child node. If it is determined that a lock is not acquirable for the child node, then process 1000 can end (at block 1040). If it is determined that a lock is acquirable for the child node, then process 1000 can proceed to block 1025 to acquire the lock for the child node. At block 1030, process 1000 can perform a queued action for the resource corresponding to the child node. At block 1035, process 1000 can release the lock acquired for the child after the queued action is performed. Process 1000 can end (at block 1040).

It will be appreciated that process 1000 is illustrative and that variations and modifications are possible. Steps described as sequential may be executed in parallel, order of steps may be varied, and steps may be modified, combined, added or omitted. Further, while process 1000 is described as being implemented in a message management service that acts as an intermediary between a messaging service and a user-operable client, those skilled in the art with access to the present disclosure will appreciate that process 1000 or a similar process can also be implemented in a messaging service, allowing the messaging service itself to serialize actions performed for a message account.

Figure 11:
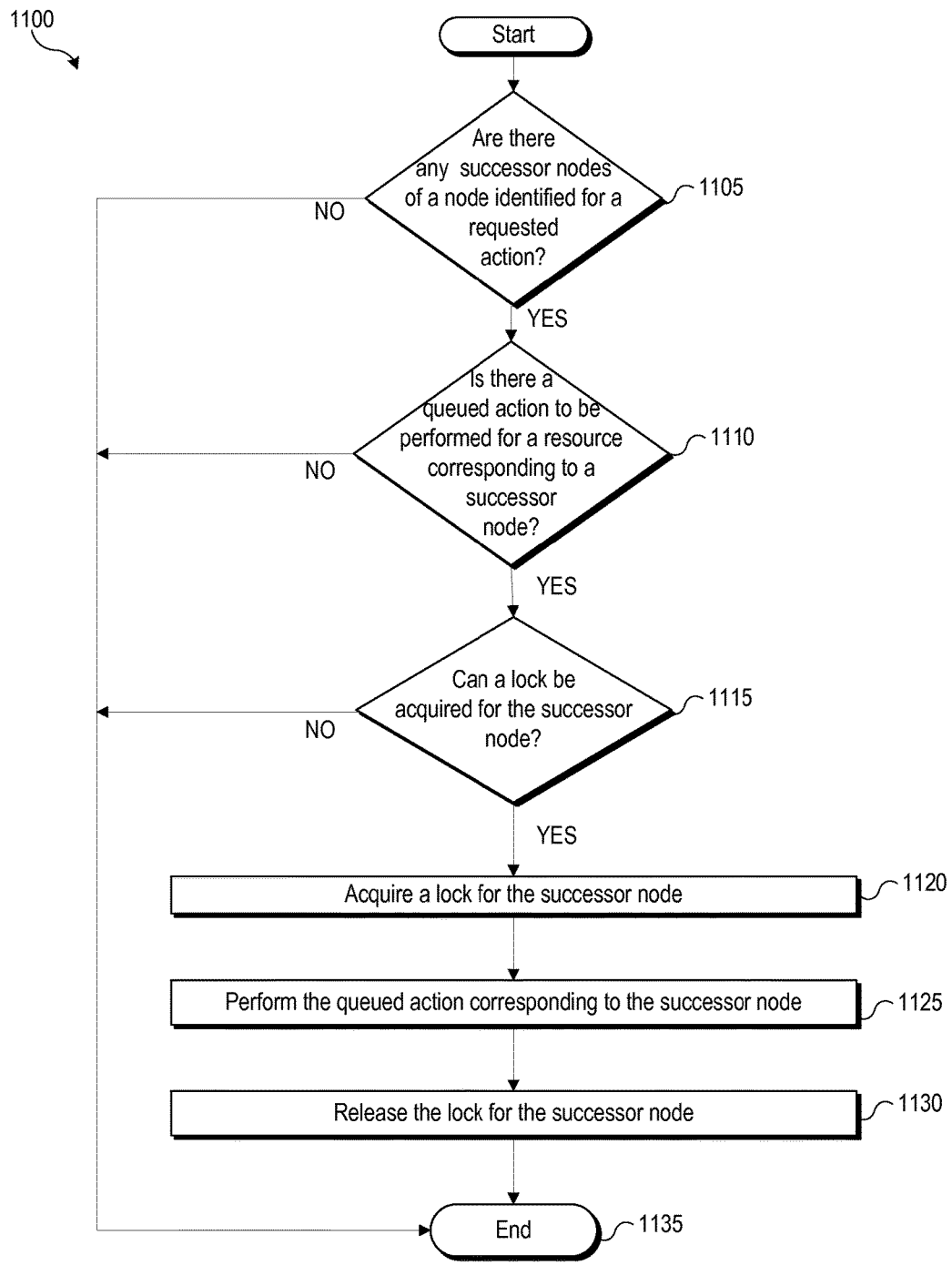
FIG. 11 shows a flow diagram of a process for scheduling actions to be performed for a message account according to an embodiment of the present invention.

FIG. 11 shows a flow diagram of a process 1100 for scheduling actions to be performed for a message account according to an embodiment of the present invention. Process 1100 can be performed by a message management service (e.g., message management service 200 of FIG. 2).

In some embodiments, process 1100 can be performed before process 900 of FIG. 9 performs block 930 to acquire a lock for a node identified for the requested action. Process 1100 can determine whether any actions identified in an action queue (e.g., action queue 234 of FIG. 2) are to be performed for a resource that corresponds to a successor node of the node identified for the requested action in process 900. For example, when the identified node for the requested action corresponds to a folder (e.g., N2 312), process 1100 can determine whether any actions are queued for a resource such as an email message (e.g., "Email 1") corresponding to a successor node (e.g., N5 322). In the event that an action is queued for a successor node, process 1100 can perform the queued action before process 900 performs block 930 to acquire a lock to serialize the requested action in process 900.

Process 1100 can enable actions to be performed first for resources that demand less serialization, such that fewer resources for an email account are blocked for performing requested actions. Therefore, it can be useful for process 1100 to perform actions for resources corresponding to successor nodes because fewer resources are restricted during serialization of an action for a lower level (e.g., a third level) node. By performing actions corresponding to resources for lower level nodes, process 1100 can permit more actions for other resources (e.g., email messages) to be performed concurrently that may otherwise be prevented from being performed if the requested action in process 900 were performed first. Process 900 can resume processing at block 930 when process 1100 has completed.

Beginning process 1100, at block 1105, process 1100 can determine whether hierarchical data structure (e.g., data structure 300 of FIG. 3) includes any nodes that are successors (e.g., a child or a grandchild) of a node, corresponding to a resource of a requested action. To illustrate, a user operating a client can cause client 202 of FIG. 2 to request an action to be performed for a folder corresponding to a node (e.g., N2 312) managed in data structure 300 by message management service 200. In this example, message management service 200 can identify successor nodes (e.g., N5 322 or N6 324) of the node (e.g., N2 312) corresponding to the requested action. If it is determined that the node does not have any successor nodes, then process 1100 can end (at block 1135). If it is determined that the node has successor nodes, then process 1100 can proceed to block 1110.

At block 1110, process 1100 can determine whether message management service 200 has queued actions to be performed for a resource corresponding to an identified successor node. Message management service 200 can search action queue 234 to identify actions that have been queued for an identified successor node. In some embodiments in which multiple successor nodes are identified, message management service can identify a queued action for a different resource corresponding to each successor node. If it is determined that there are no queued actions, process 1100 can end (at block 1135). If it is determined that there is at least one queued action for a resource corresponding to an identified successor node, process can proceed to block 1115.

At block 1115, process 1100 can determine whether a lock is acquirable for each identified successor node corresponding to a resource for which a queued action is to be performed. To determine whether a lock is acquirable for each identified successor nodes, process 1100 can determine whether the each of child node, any successor nodes of the child node, and any ancestor nodes of the child node have acquired a lock. If it is determined that a lock is not acquirable for each identified successor node, process 1100 can proceed to end (at block 1135). If it is determined that a lock is acquirable for each identified successor node, process 1100 can proceed to block 1120.

At block 1120, process 1100 can acquire a lock for an identified successor node. At block 1125, process 1100 can perform the queued action to for each identified successor node for which a lock was acquired. At 1130, process 1100 can perform release the lock acquired for the identified successor nodes for which a queued action was performed. Process can end at block 1135.

It will be appreciated that process 1100 is illustrative and that variations and modifications are possible. Steps described as sequential may be executed in parallel, order of steps may be varied, and steps may be modified, combined, added or omitted. Further, while process 1100 is described as being implemented in a message management service that acts as an intermediary between a messaging service and a user-operable client, those skilled in the art with access to the present disclosure will appreciate that process 1100 or a similar process can also be implemented in a messaging service, allowing the messaging service itself to serialize actions performed for a message account.

Figure 12:
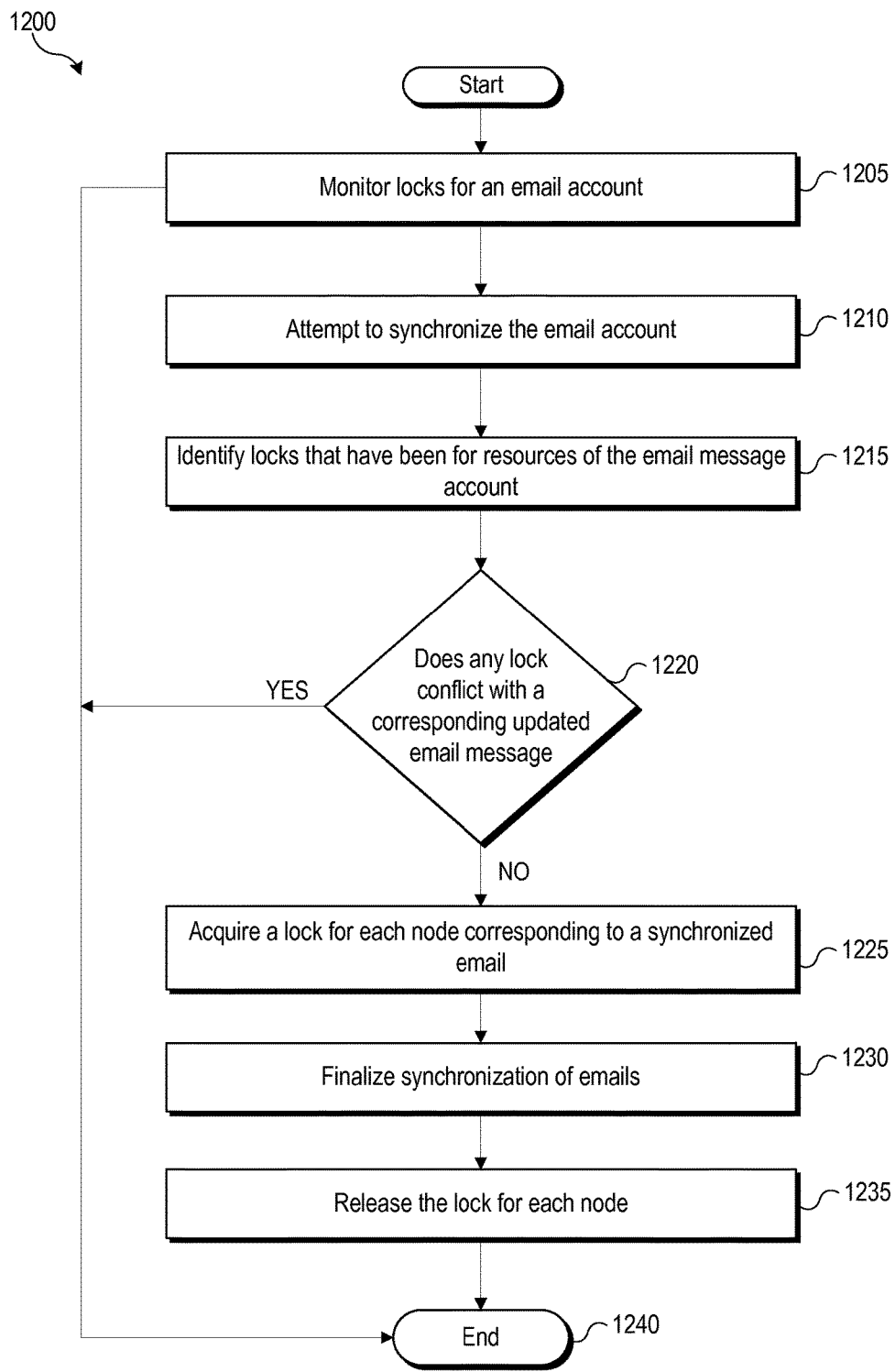
FIG. 12 shows flow diagram of a process for optimistic serialization of actions for synchronization of a message account according to an embodiment of the present invention.

FIG. 12 shows a flow diagram of a process 1200 for optimistic serialization of actions for synchronization of a message account according to an embodiment of the present invention. Process 1200 can be performed by a message management service (e.g., message management service 200 of FIG. 2). Process 1200 can enable message management service to synchronize emails for an email account in advance without knowledge of emails that need to be synchronized. Process 1200 can enable the message management service to prevent locking resources for an entire email account and instead, obtain a lock for resources corresponding to emails that have been identified for synchronization.

At block 1205, process 1200 can monitor locks for resources of an email account. For example, lock state information from each node can be obtained to identify a lock status before performing a synchronization operation.

At block 1210, process 1200 can attempt to synchronize the email account with a messaging service that provides the email account. An attempt is made because the synchronization is being performed without determining whether all resources for an email account can be locked. By performing the synchronization without acquiring a lock for each resource or a lock on the entire email account, there is no guarantee that the synchronization will be successful.

At block 1215, process 1200 can include identifying locks that have been issued for resources of the email account. For example, lock state information can be examined for each node to determine whether a lock as issued after the synchronization. Such information can enable a determination to be made whether a particular resource was synchronized or whether the resource was locked for the synchronization or another action.

At block 1220, process 1200 can include determining whether any locks that have been issued conflict with a corresponding updated resource (e.g., email message) of the email account. In some embodiments, to determine whether a conflict exists between a lock and a resource, a comparison can be made to determine whether each identified lock was issued for an email during an attempted synchronization. One technique for making such a determination can include using information included in each node (such as the lock history described above with respect to FIGS. 4 and 6) that can indicate a change in the lock state after the synchronization was performed for a resource corresponding to the lock. If it is determined that at least one lock conflicts with a corresponding updated resource, then process 1200 can proceed to block 1205 to monitor locks and reattempt synchronization. In some embodiments, a lock can conflict with a corresponding updated resource if the information in a node indicates that the lock for the node did not change state when the synchronization was attempted. In this instance, because a lock state did not change for a node, it can be determined that synchronization could not be performed for the resource corresponding to the node because a lock could not be acquired for the attempted synchronization. In some embodiments, process 1200 can end (at block 1240) after a number of attempted synchronizations have been performed at block 1210. If it is determined that no lock conflicts with a corresponding updated resource, then process 1200 can proceed to block 1225.

At block 1225, process 1200 can acquire a lock for each email message that was synchronized. By obtaining a lock for each email message, message management service can ensure that the email messages will not be modified before they are committed or finalized as the most current email messages stored locally at the message management service.

At block 1230, process 1200 can finalize each email message that was synchronized. Subsequently, at block 1235, process 1200 can release the lock for each node corresponding to an email message that is finalized. Process 1200 can end at block 1240.

It will be appreciated that process 1200 is illustrative and that variations and modifications are possible. Steps described as sequential may be executed in parallel, order of steps may be varied, and steps may be modified, combined, added or omitted. For example, process 1200 can attempt to retry synchronization at block 1210 for a particular number of times. After the number of retries has been reached, process 1200 can perform synchronization after obtaining a resource lock on an account-level node for the email account. Further, while process 1200 is described as being implemented in a message management service that acts as an intermediary between a messaging service and a user-operable client, those skilled in the art with access to the present disclosure will appreciate that process 1000 or a similar process can also be implemented in a messaging service, allowing the messaging service itself to serialize actions performed for a message account.

Figure 13:
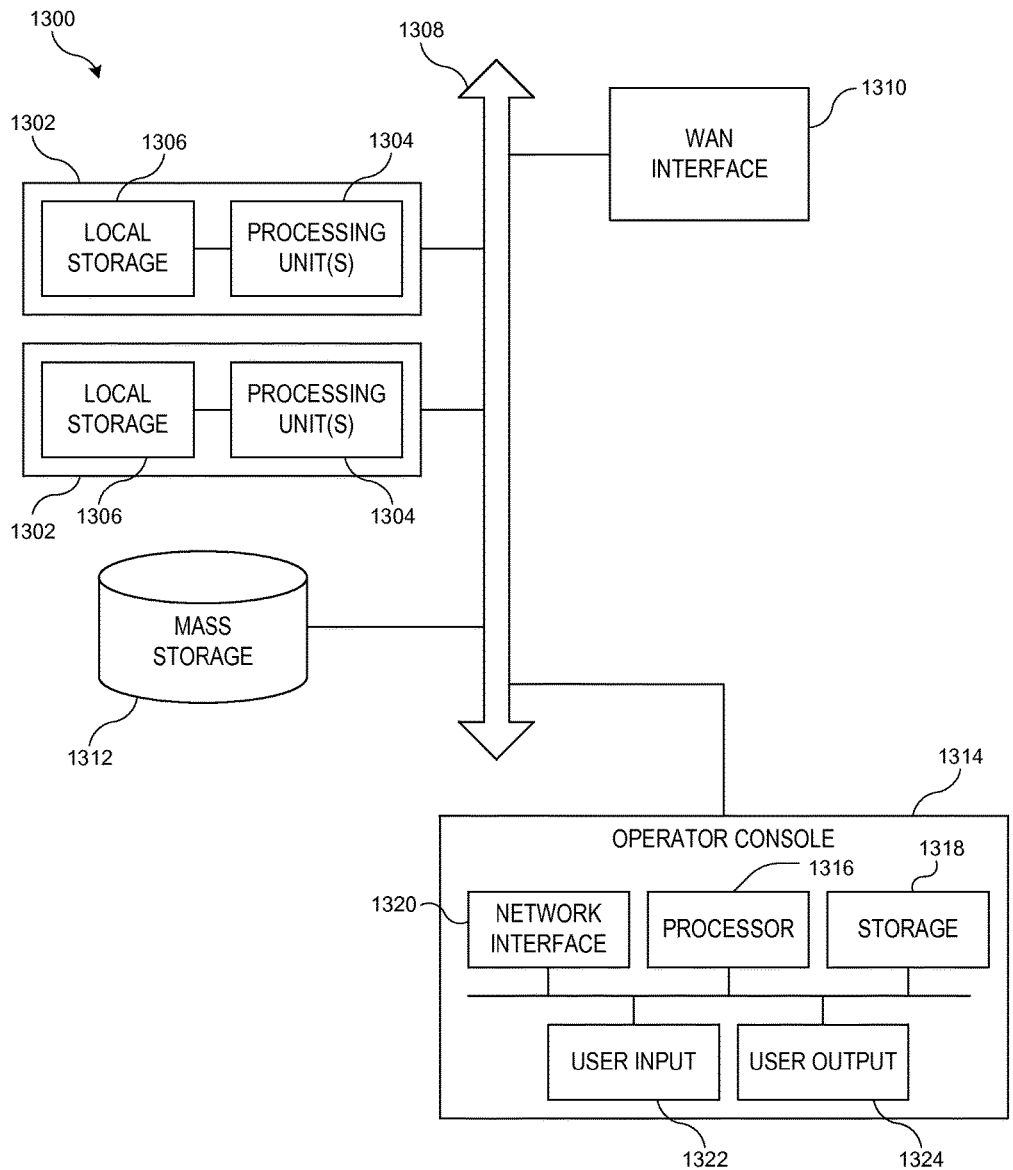
FIG. 13 shows a simplified block diagram of a representative server system and client computer system usable to implement certain embodiments of the present invention.

Various operations described herein can be implemented on computer systems, which can be of generally conventional design. FIG. 13 shows a simplified block diagram of a representative server system 1300 and client computer system 1314 usable to implement certain embodiments of the present invention. In various embodiments, server system 1300 or similar systems can implement message management service 200, messaging services 204, or any other services or servers described herein or portions thereof. Client computer system 1314 or similar systems can implement client device 202 or other clients described herein.

Server system 1300 can have a modular design that incorporates a number of modules 1302 (e.g., blades in a blade server implementation); while two modules 1302 are shown, any number can be provided. Each module 1302 can include processing unit(s) 1304 and local storage 1306.

Processing unit(s) 1304 can include a single processor, which can have one or more cores, or multiple processors. In some embodiments, processing unit(s) 1304 can include a general-purpose primary processor as well as one or more special-purpose co-processors such as graphics processors, digital signal processors, or the like. In some embodiments, some or all processing units 1304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1304 can execute instructions stored in local storage 1306. Any type of processors in any combination can be included in processing unit(s) 1304.

Local storage 1306 can include volatile storage media (e.g., conventional DRAM, SRAM, SDRAM, or the like) and/or non-volatile storage media (e.g., magnetic or optical disk, flash memory, or the like). Storage media incorporated in local storage 1306 can be fixed, removable or upgradeable as desired. Local storage 1306 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 1304 need at runtime. The ROM can store static data and instructions that are needed by processing unit(s) 1304. The permanent storage device can be a non-volatile read-and-write memory device that can store instructions and data even when module 1302 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1306 can store one or more software programs to be executed by processing unit(s) 1304, such as an operating system and/or programs implementing various server functions such as functions of message management modules 212, messaging service interface 214, and/or client interface 210 of FIG. 2, or any other server(s) associated with messaging system 100 of FIG. 1. "Software" refers generally to sequences of instructions that, when executed by processing unit(s) 1304 cause server system 1300 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 1304. Software can be implemented as a single program or a collection of separate programs or program modules that interact as desired. From local storage 1306 (or non-local storage described below), processing unit(s) 1304 can retrieve program instructions to execute and data to process in order to execute various operations described herein.

In some server systems 1300, multiple modules 1302 can be interconnected via a bus or other interconnect 1308, forming a local area network that supports communication between modules 1302 and other components of server system 1300. Interconnect 1308 can be implemented using various technologies including server racks, hubs, routers, etc.

A wide area network (WAN) interface 1310 can provide data communication capability between the local area network (interconnect 1308) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 1306 is intended to provide working memory for processing unit(s) 1304, providing fast access to programs and/or data to be processed while reducing traffic on interconnect 1308. Storage for larger quantities of data can be provided on the local area network by one or more mass storage subsystems 1312 that can be connected to interconnect 1308. Mass storage subsystem 1312 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1312. In some embodiments, additional data storage resources may be accessible via WAN interface 1310 (potentially with increased latency).

Server system 1300 can operate in response to requests received via WAN interface 1310. For example, one of modules 1302 can implement a supervisory function and assign discrete tasks to other modules 1302 in response to received requests. Conventional work allocation techniques can be used. As requests are processed, results can be returned to the requester via WAN interface 1310. Such operation can generally be automated. Further, in some embodiments, WAN interface 1310 can connect multiple server systems 1300 to each other, providing scalable systems capable of managing high volumes of activity. Conventional or other techniques for managing server systems and server farms (collections of server systems that cooperate) can be used, including dynamic resource allocation and reallocation.

Server system 1300 can interact with various user-owned or user-operated devices via a wide-area network such as the Internet. An example of a user-operated device is shown in FIG. 13 as client computing system 1314. Client computing system 1314 can be implemented, for example, as a consumer device such as a smart phone, other mobile phone, tablet computer, wearable computing device (e.g., smart watch, eyeglasses), desktop computer, laptop computer, and so on.

For example, client computing system 1314 can communicate via WAN interface 310. Client computing system 1314 can include conventional computer components such as processing unit(s) 1316, storage device 1318, network interface 1320, user input device 1322, and user output device 1324. Client computing system 1314 can be a computing device implemented in a variety of form factors, such as a desktop computer, laptop computer, tablet computer, smart phone, other mobile computing device, wearable computing device, or the like.

Processor 1316 and storage device 1318 can be similar to processing unit(s) 1304 and local storage 1306 described above. Suitable devices can be selected based on the demands to be placed on client computing system 1314; for example, client computing system 1314 can be implemented as a "thin" client with limited processing capability or as a high-powered computing device. Client computing system 1314 can be provisioned with program code executable by processing unit(s) 1316 to enable various interactions with server system 1300 of a message management service such as accessing messages, instructing the service to defer messages, and so on. Some client computing systems 1314 can also interact with a messaging service independently of the message management service.

Network interface 1320 can provide a connection to a wide area network (e.g., the Internet) to which WAN interface 1310 of server system 1300 is also connected. In various embodiments, network interface 1320 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1322 can include any device (or devices) via which a user can provide signals to client computing system 1314; client computing system 1314 can interpret the signals as indicative of particular user requests or information. In various embodiments, user input device 1322 can include any or all of a keyboard, touch pad, touch screen, mouse or other pointing device, scroll wheel, click wheel, dial, button, switch, keypad, microphone, and so on.

User output device 1324 can include any device via which client computing system 1314 can provide information to a user. For example, user output device 1324 can include a display to display images generated by or delivered to client computing system 1314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1324 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1304 and 1316 can provide various functionality for server system 1300 and client computing system 1314, including any of the functionality described herein as being performed by a server or client, or other functionality associated with message management services.

It will be appreciated that server system 1300 and client computing system 1314 are illustrative and that variations and modifications are possible. Computer systems used in connection with embodiments of the present invention can have other capabilities not specifically described here. Further, while server system 1300 and client computing system 1314 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. Particular data structures and resources described herein can be varied. Embodiments of the invention can be realized using a variety of computer systems and communication technologies including but not limited to specific examples described herein.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   receiving, by a server computer, a request to perform a first action for a first resource of an email message account provided by a messaging service provider;
   identifying, by the server computer, a first node, in a hierarchical data structure, that comprises the first resource indicated by the request, wherein the hierarchical data structure includes a plurality of nodes, each node comprising a different resource of the email message account;
   identifying, by the server computer, one or more second nodes in the hierarchical data structure that has a dependency relationship with the first node, wherein each identified second node corresponds to a respective second resource of the email message account, and wherein the dependency relationship indicates a dependency between the first resource and each respective second resource:
  determining, by the server computer, that a first lock protecting the first node is currently available for acquisition;
  determining, by the server computer, that a second lock protecting each identified second node of the one or more identified second nodes is currently available for acquisition by any of the identified one or more second nodes; and
  in response to determining that both the first lock is available for acquisition and that a second lock is available for acquisition by each of the one or more identified second nodes, blocking one or more conflicting actions for the email message account from being performed concurrently with the first action while permitting non-conflicting actions for the email message account to be performed concurrently by acquiring the first lock for the first node;
  after acquiring the first lock for the first node, performing the first action for the first resource;
  receiving, by the server computer, a second request to perform a second action for a second resource of the email message account provided by the messaging service provider;
  identifying, by the server computer, that one of the identified second nodes comprises the second resource indicated by the second request;
  responsive to identifying that the first lock is acquired for the first node, blocking the second action from being performed concurrently with the first after by queuing the second action for the second resource until the first lock is released; and
  after performing the first action, releasing the first lock for the first node, acquiring the second lock for the one identified second node, and performing the second action for the second resource.

2. The computer-implemented method of claim 1 further comprising:
  in the event that the lock has been acquired for either the first node or an identified second node, blocking the first action from being performed for the first resource until the lock is acquirable for the first node.

3. The computer-implemented method of claim 1 further comprising:
  receiving a request to perform a second action for the first resource corresponding to the first node; and
  in the event that the lock is acquired for the first node, blocking the second action from being performed for the first resource until the lock is acquirable for the first node.

4. The computer-implemented method of claim 1 further comprising:
  receiving a request to perform a second action for a third resource corresponding to the identified second node; and
  in the event that the lock is acquired for the first node, blocking the second action from being performed for the second resource until the lock is acquirable for the identified second node.

5. The computer-implemented method of claim 1 wherein the identified second node has a dependency relationship as an ancestor of the first node in the hierarchical data structure, and wherein the identified second node corresponds to a particular second resource, the particular second resource corresponding to an email message folder or the email message account.

6. The computer-implemented method of claim 1 wherein the identified second node has a dependency relationship as a successor of the first node in the hierarchal data structure and wherein the identified second node corresponds to a particular second resource, the particular second resource corresponding to an email message folder or an email message.

7. The computer-implemented method of claim 1 wherein the identified second node has a dependency relationship as an ancestor of the first node in the hierarchical data structure, and wherein the identified second node corresponds to a particular second resource, the particular second resource corresponding to an email message folder or an email message thread.

8. The computer-implemented method of claim 1 wherein a plurality of second nodes are identified as having a dependent relationship with the first node, wherein the first resource corresponds to an email message folder, wherein one of the plurality of second nodes corresponds to an email account and has a dependency relationship as a parent of the first node, and wherein a different one of the plurality of second node corresponds to an email message and has a dependency relationship as a child of the first node.

9. The computer-implemented method of claim 1 further comprising receiving a request to perform an action for a third resource of the email message account;
  identifying a third node, in the hierarchical data structure, that corresponds to the third resource;
  determining whether the third node has a dependency relationship with the first node; and
  in the event that the third node does not have a dependency relationship with the first node:
  acquiring a lock for the third node;
  performing the action for the third resource; and
  releasing the lock for the third node after the action for the third resource is performed.

10. The computer-implemented method of claim 1 further comprising:
  before the lock is acquired for the first node when the lock is acquirable:
  determining whether an identified second node has a dependency relationship as a successor of the first node;
  identifying a queued action to be performed for a second resource corresponding to the identified second node;
  acquiring a lock for the identified second node;
  performing the queued action after the lock for the second identified node is acquired; and
  releasing the lock for the identified second node after the queued action is performed.

11. The computer-implemented method of claim 10 wherein the first resource corresponds to an email message folder and wherein the second resource corresponds to an email message.

12. A server system comprising:
  a client interface configured to communicate with a client device;
  a messaging service interface configured to communicate with a messaging service that provides an email message account;
  a hierarchical data structure including a plurality of nodes, each node comprising a different resource of the email message account;

one or more message management modules coupled to the client interface, the messaging service interface, and the hierarchical data structure, the one or more message management modules being configured to:
receive a request to perform a first action for a first resource of an email message account provided by a messaging service provider;
identify a first node, in a hierarchical data structure, that comprises the first resource indicated by the request, wherein the hierarchical data structure includes a plurality of nodes, each node comprising a different resource of the email message account;
identify one or more second nodes in the hierarchical data structure that has a dependency relationship with the first node, and wherein each identified second node corresponds to a different second resource of the email message account;
determine that a first lock protecting the first node is currently available for acquisition;
determine that a respective second lock protecting each identified second node of the one or more identified second nodes is currently available for acquisition by each of the identified one or more second nodes; and
in response to determining that both the first lock is available for acquisition and the respective second lock protecting each of the one or more identified second nodes is currently available for acquisition, block one or more conflicting actions for the email message account from being perform concurrently with the first action while permitting non-conflicting actions for the email message account: to be performed concurrently by acquiring the first lock for the first node;
perform the first action for the first resource after acquiring the first lock for the first node;
receive a second request to perform a second action for a second resource of the email message account provided by the messaging service provider; identify that one of the identified second nodes comprises the second resource indicated by the second request;
responsive to identifying that the first lock is acquired for the first node, block the second action from being performed concurrently with the first action by queuing the second action for the second resource until the first lock is released; and
release the first lock for the first node after the first action is performed, acquire the second lock for the one identified second node, and perform the second action for the second resource.

13. The server system of claim 12 wherein the one or more message management modules are further configured to block the first action from being performed for the first resource until a lock is acquirable for the first node, in the event that a lock has been acquired for either the first node or an identified second node.

14. The server system of claim 12 wherein the first resource corresponds to an email message folder and an identified second node corresponds to a particular second resource, the particular second resource corresponding to the email message account, and wherein the first action is to update the email message folder.

15. The server system of claim 12 wherein the first resource corresponds to an email message and an identified second node corresponds to a particular second resource, the particular second resource corresponding to an email message folder, and wherein the first action is to update the email message or delete the email message.

16. A computer-implemented method comprising:
identifying, by a server computer, a first node, in a hierarchical data structure, that corresponds to a first resource of an email message account for which a first action is to be performed, wherein the hierarchical data structure includes a plurality of nodes, each node comprising a different resource of the email message account, wherein each node in the plurality of nodes has a respective lock;
determining, by the server computer, that the respective lock corresponding to the first node and each node having a dependency relationship with the first node has not been acquired by the server computer;
in response to determining that the respective locks protecting the respective nodes are currently available for acquisition, blocking, by the server computer, one or more conflicting actions for the email message account from being performed concurrently with the first action while permitting non-conflicting actions for the email message account to be performed concurrently by acquiring a first lock for the first node;
performing the first action after the first lock for the first node is acquired;
identifying a second node in the hierarchical data structure, the second node corresponding to a second resource of the email message account for which a second action is to be performed, wherein the second node has a dependency relationship with the first node;
responsive to determining that the first lock is acquired by the first node, blocking the second action from being performed concurrently with the first action by queuing the second action until the first lock is released;
identifying, by the server computer, a third node, in the hierarchical data structure, that corresponds to a third resource, wherein the first node and the third node do not have a dependency relationship and are children of a common parent node;
identifying a third action to be performed for the third resource corresponding to the third acquiring a third lock for the third node;
performing the third action after the third lock for the third node is acquired;
releasing the first lock for the first node after the first action is performed; and
releasing the third lock for the third node after the third action is performed.

17. The computer-implemented method of claim 16 wherein the first action and the third action are performed concurrently.

18. The computer-implemented method of claim 16 wherein the first resource corresponds to a first email message and the third resource corresponds to a third email message, and wherein the parent node corresponds to a resource different from the first resource and the third resource, the different resource corresponding to an email message folder.

19. The computer-implemented method of claim 16 wherein the first resource corresponds to a first email message folder and the third resource corresponds to a third email message folder, and wherein the parent node a resource different from the first resource and the third resource, the different resource corresponding to an email message account.

20. The computer-implemented method of claim 16 further comprising:
receiving a request to perform a fourth action for a fourth resource of the email message account;

determining that the fourth resource corresponds to a fourth node in the hierarchical data structure, wherein the fourth node has a dependency relationship as a child of the parent node and does not have a dependency relationship with either the first node or the third node;

in the event that the lock is acquired for the first node, acquiring a lock for the fourth node;

performing the fourth action after the lock for the fourth node is acquired; and releasing the lock for the fourth node after the fourth action is performed.

* * * * *